United States Patent
Kim et al.

(10) Patent No.: US 6,816,476 B2
(45) Date of Patent: Nov. 9, 2004

(54) REVERSE CLOSED LOOP POWER CONTROL IN CONTROL HOLD STATE FOR CDMA COMMUNICATION SYSTEM

(75) Inventors: Young-Ky Kim, Seoul (KR); Su-Won Park, Seoul (KR); Jae-Min Ahn, Seoul (KR); Jae-Yeol Kim, Kunpo-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/305,711

(22) Filed: Nov. 27, 2002

(65) Prior Publication Data

US 2003/0078067 A1 Apr. 24, 2003

Related U.S. Application Data

(62) Division of application No. 09/382,443, filed on Aug. 25, 1999.

(30) Foreign Application Priority Data

Aug. 25, 1998 (KR) .............................................. 35056/98

(51) Int. Cl.[7] .............................................. H04B 7/212
(52) U.S. Cl. ...................................................... 370/342
(58) Field of Search ................................ 370/342, 328, 370/335; 455/69, 522

(56) References Cited

U.S. PATENT DOCUMENTS

| | | | | |
|---|---|---|---|---|
| 5,107,487 A | * | 4/1992 | Vilmur et al. | 370/342 |
| 5,590,409 A | * | 12/1996 | Sawahashi et al. | 455/69 |
| 5,751,763 A | | 5/1998 | Bruckert | |
| 5,963,870 A | * | 10/1999 | Chheda et al. | 455/522 |
| 6,456,604 B1 | * | 9/2002 | Lee et al. | 370/328 |
| 6,467,092 B1 | | 10/2002 | Geile et al. | |
| 6,480,481 B1 | * | 11/2002 | Park et al. | 370/342 |
| 6,542,756 B1 | * | 4/2003 | Kim | 455/522 |
| 2001/0023188 A1 | * | 9/2001 | Komatsu | 455/522 |
| 2001/0033558 A1 | * | 10/2001 | Matsuki | 370/355 |

FOREIGN PATENT DOCUMENTS

| | | |
|---|---|---|
| EP | 0 682 418 | 5/1995 |
| WO | WO 98/36508 | 8/1998 |

* cited by examiner

*Primary Examiner*—William Cumming
(74) *Attorney, Agent, or Firm*—Dilworth & Barrese, LLP

(57) ABSTRACT

A base station device for a CDMA communication system includes a controller for changing a reference value for reverse closed loop power control in a control hold state, and a forward dedicated control channel transmitter for transmitting a power control bit for controlling transmission power of a reverse link according to the changed reference value.

8 Claims, 24 Drawing Sheets

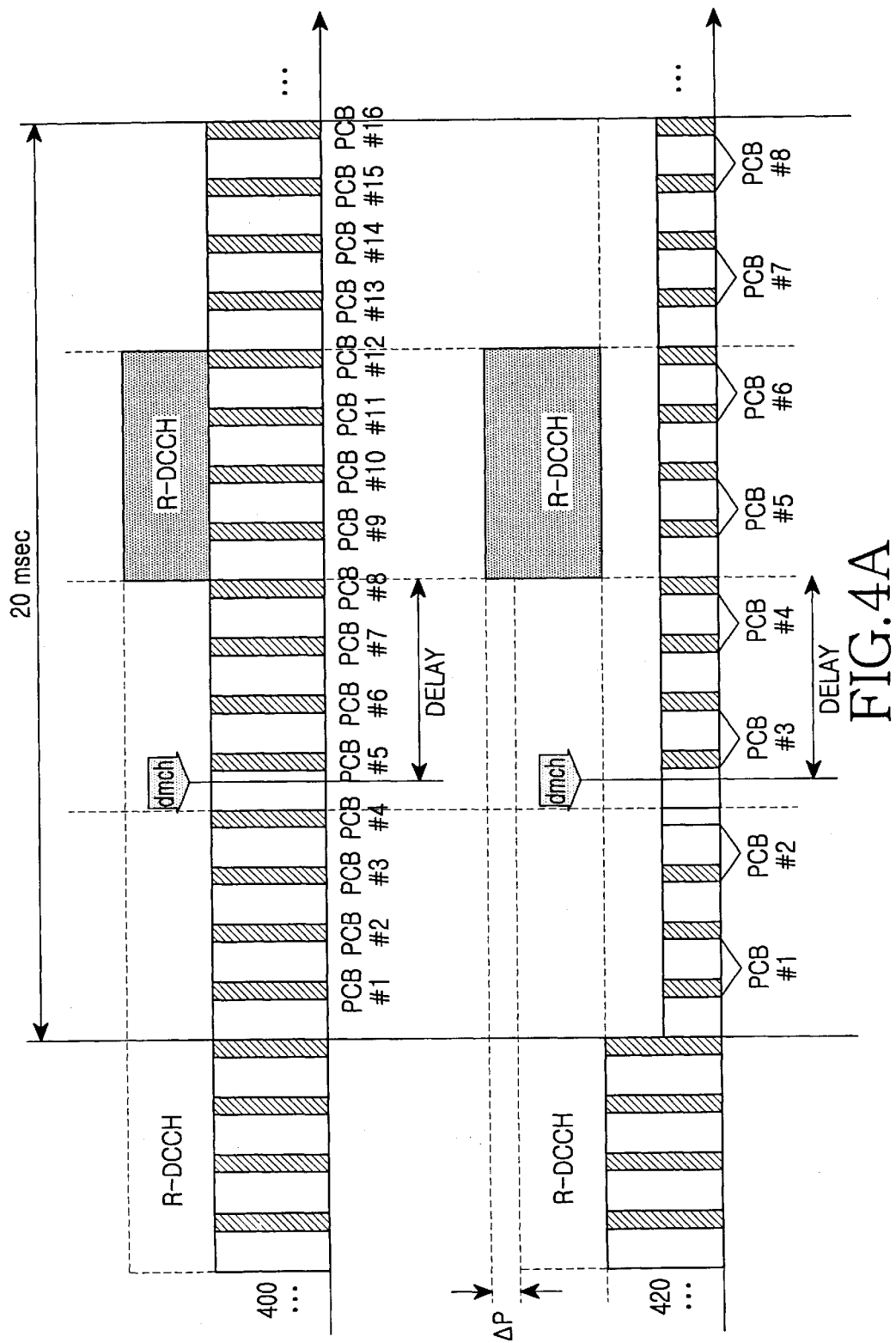

REVERSE CLOSED LOOP POWER CONTROL IN CONTROL HOLD STATE FOR CDMA COMMUNICATION SYSTEM

This application is a Divisional of parent application Ser. No. 09/382,443, filed on Aug. 25, 1999 which claimed priority to Korean Patent Application Serial No. 35056/98, filed Aug. 25, 1998.

BACKGROUND OF THE INVENTION

1. Field of the Invention

The present invention relates generally to a communication device and method for a CDMA communication system, and in particular, to a device and method for performing closed loop power control in a control hold state.

2. Description of the Related Art

A conventional Code Division Multiple Access (CDMA) mobile communication system based on the IS-95 standard primarily supports a voice service. However, a mobile communication system in accordance with the IMT-2000 standard will support not only the voice service, but also a high-speed data transfer service. For example, the IMT-2000 standard can support a high-quality voice service, a moving picture service, an Internet search service, etc.

In a mobile communication system, a data communication service is characterized by short transmissions (i.e., burst data) alternating with long non-transmission periods. Therefore, for the data communication service, a mobile communication system employs a channel assignment method in which a dedicated channel is assigned for only the short periods of (i.e., the burst duration) data transmission. That is, taking into consideration the limited radio resources, base station capacity and power consumption of a mobile station, the mobile communication system connects a traffic channel and a control channel only for an actual data transmission duration and otherwise releases the dedicated channels (i.e., the traffic channel and the control channel) when there is no data to transmit for a predetermined time. When the dedicated channels are released, communication is performed through a common channel, thus increasing the efficiency of the radio resources.

To this end, the mobile communication system includes various operating states according to the channel assignment and the existence/non-existence of state information. FIG. 7 illustrates a state transition diagram of a mobile communication system for the various operating states describing the packet service. As shown in FIG. 7, the state transition diagram for the packet service illustrates a packet null state, an initialization state, an active state, a control hold state, a suspended state, a dormant state and a reconnect state. In the control hold, active and suspended states, a service option is connected and in the other states, the service option is not connected.

In a conventional CDMA mobile communication system which mainly supports the voice service, a traffic channel is released upon completion of data transmission and the traffic channel is then reconnected when it is required to transmit data. The conventional channel assignment method, however, is not suitable for a packet data service because of a time delay for reconnecting the channel. Therefore, to provide the packet data service as well as the voice service, there is required an improved channel assignment method.

In general, during the packet data service, data transmission occurs intermittently (i.e., in bursts). Therefore, a transmission duration of packet data alternates with periods of non-transmission. The mobile communication system either releases or maintains a channel in use for the periods of non-transmission. However, there are drawbacks associated with both maintaining and releasing a channel, namely, release of the channel causes an increase in service time due to a time delay for reconnection of the channel, and maintaining the channel causes a waste of the channel resources. To solve these problems, a dedicated control channel is commonly provided between a base station and a mobile station to exchange traffic channel-related control signals over the dedicated control channel for the data transmission. The traffic channel is released and only the dedicated control channel and a reverse pilot/PCB channel are maintained for the data non-transmission duration. When the dedicated control channel is not activated, only the reverse pilot/PCB channel is maintained. The reverse pilot/PCB channel is required to maintain synchronization. In this manner, the mobile communication system can prevent a waste of channel resources and rapidly reconnect the traffic channel when there is data to transmit. The operating state described above is called a control hold state (see FIG. 7). The control hold state can be divided into a normal substate and a slotted substate, as shown in FIG. 8. The normal substate refers to a state where there is no data to transmit over a traffic channel, and only a control signal is exchanged over a dedicated control channel or only the reverse pilot/PCB channel is maintained. The slotted substate refers to a state where connection of the dedicated control channel is maintained but no control signal and no reverse pilot/PCB channel is maintained to reduce power consumption of a mobile station. However, to make a transition from the slotted substate to the normal substate to restart control data transmission, resynchronization should be performed between a base station and a mobile station, since no control signal is exchanged between the base station and the mobile station in the slotted substate However, when closed-loop power control of the reverse pilot/PCB channel is maintained, as in the case where there exists a dedicated control channel and the system stays in a data transmission state even though there is no message to transmit over the dedicated control channel in the normal substate, interference and power consumption may increase unnecessarily.

FIG. 1A illustrates a conventional base station transmitter for a conventional CDMA communication system.

With regard to forward link channels, the base station includes a pilot channel for sync acquisition and channel estimation, a forward common control channel (F-CCH) for communicating a control message in common to all the mobile stations located in a cell (or service) area of the base station, a forward dedicated control channel (F-DCCH) for exclusively communicating a control message to a specific mobile station located in the cell area of the base station, and a forward dedicated traffic channel (F-DTCH) for exclusively communicating traffic data (i.e., voice and packet data) to a specific mobile station located in the cell area of the base station. The forward dedicated control channel includes a sharable forward dedicated control channel (sharable F-DCCH) for exclusively communicating a control message to a specific mobile station on a time-division basis. The forward dedicated traffic channel includes a forward fundamental channel (F-FCH) and a forward supplemental channel (F-SCH).

Referring to FIG. 1A, demultiplexers 120, 122, 124 and 126 demultiplex corresponding channel-coded interleaved channel information to I and Q channels. Here, serial-to-parallel converters can be used for the demultiplexers 120,

122, 124 and 126. It is assumed herein that signals input to the demultiplexers 120, 122, 124 and 126 are signal-mapped signals. Mixers 110, 130, 131, 132, 133, 134, 135, 136 and 137 multiply signals output from the associated demultiplexers by orthogonal codes assigned to the corresponding channels, for signal spreading and channel separation. The orthogonally spread signals output from the mixers 130–137 are gain controlled by associated amplifiers 140–147.

Signals output from the amplifiers 140–147 and the mixer 110 are summed by summers 150 and 152 according to the I and Q channels. Since the signals applied to the summers 150 and 152 were channel separated by the orthogonal codes, the respective channel signals are orthogonal to one another. Outputs of the summers 150 and 152 are multiplied by PN (Pseudo Noise) sequences PN#I and PN#Q assigned to the base station for base station identification in a complex multiplier 160. I and Q channel signals output from the complex multiplier 160 are applied to filters 170 and 171, respectively, which bandpass filter the input signals to output bandwidth-suppressed signals. The outputs of the filters 170 and 171 are amplified by amplifiers 172 and 173. Mixers 174 and 175 multiply outputs of the amplifiers 172 and 173 by a carrier cos $(2\pi f_c t)$ to up-convert the signals to radio frequency (RF) signals. A summer 180 sums the I and Q channel signals.

A power control command transmitted from a base station to a mobile station is divided into power-up and power-down commands and is comprised of a single bit (or symbol). The mobile station determines whether to increase or decrease transmission power according to a sign of the power control bit. In FIG. 1, the power control bit has a positive sign for the power-up command and a negative sign for the power-down command.

FIG. 1B illustrates a mobile station transmitter for a conventional CDMA communication system. With regard to reverse link channels, the mobile station includes a reverse pilot/PCB (Power Control Bit) channel for multiplexing a pilot signal for sync acquisition and channel estimation and a forward power control bit for forward power control, a reverse dedicated control channel (R-DCCH) for exclusively communicating a control message to a base station, in a cell area of which the mobile station is located, and a reverse dedicated traffic channel (R-DTCH) for exclusively communicating traffic data to the base station. Further, the reverse dedicated traffic channel includes a reverse fundamental channel (R-FCH) and a reverse supplemental channel (R-SCH).

A multiplexer 210 multiplexes a signal on the reverse pilot channel and a power control bit for controlling power of the forward link. Mixers 220, 230, 240, 250 and 260 multiply corresponding channel-coded interleaved signals received over the respective reverse channels by orthogonal codes assigned to the corresponding channels to generate orthogonally spread signals for the respective channels. Outputs of the mixers 220, 240, 250 and 260 are gain controlled by amplifiers 222, 242, 252 and 262, respectively. A summer 224 sums outputs of the amplifiers 222 and 242 and an output of the multiplier 230, and a summer 254 sums outputs of the amplifiers 252 and 262. Since the signals applied to the summers 224 and 254 were channel separated by the orthogonal codes, the respective channel signals are orthogonal to one another. A complex spreader (or complex multiplier) 160 multiplies signals output from the summers 224 and 254 by a spreading code assigned to the mobile station to spread the signals. The spreading code assigned to the mobile station is generated by mixing a PN sequence for a base station, in the cell area of which the mobile station is located, by a unique long code for the mobile station. Filters 170 and 171 filter I and Q channel signals output from the complex spreader 160, respectively, to generate bandwidth suppressed signals. Amplifiers 172 and 173 amplify outputs of the filters 170 and 171, respectively. Mixers 174 and 175 multiply signals output from the amplifiers 172 and 173 by a carrier cos $(2\pi f_c t)$ to up-convert the transmission signals to RF signals. A summer 180 sums the I and Q channel signals output from the mixers 174 and 175.

In the control hold state of the conventional CDMA communication system, a dedicated traffic channel is released and a control signal is communicated over forward and reverse dedicated control channel. A description will be provided regarding the operation of a reverse pilot/PCB channel in the control hold state. Herein, it is assumed that the control hold state is divided into a normal substate and a slotted substate. However, even in the case where the control hold state is not divided into the normal substate and the slotted substate, the reverse pilot/PCB channel will have the same operation.

A description will now be made to transmission signal structures of a base station and a mobile station according to the prior art.

Reference numeral 300 in FIGS. 3A and 3B illustrates how a mobile station conventionally transmits a signal on a reverse pilot/PCB channel, when a reverse dedicated control channel (R-DCCH) is not activated in a control hold state/ normal substate. To avoid resync acquisition at a base station, the mobile station continuously transmits the reverse pilot/PCB channel in the control hold state/normal substate, and a reference value $\theta_1$ used for closed loop power control is maintained to be equal to that in an active state unless the reference value is changed due to outer loop power control which depends on a frame error ratio. Transmission of the reverse pilot/PCB channel is discontinued when a transition to the control hold state/slotted substate occurs. However, the reverse pilot/PCB channel is transmitted before the transition, thus increasing interference of the reverse link. The increase in interference of the reverse link inevitably decreases a capacity of the reverse link.

Reference numeral 400 in FIG. 4A represents positions where a reverse dedicated control channel (R-DCCH) having a frame length of 5 ms can be conventionally generated when a reverse dedicated MAC logical channel (dmch) is generated in the control hold state/normal substate. After generating the dmch, the R-DCCH can be transmitted within 5 ms in maximum. Since the R-DCCH can be transmitted only at positions corresponding to multiples of 5 ms, the number of cases where the R-DCCH can exist is small, so that the base station need only determine the existence/ nonexistence of the R-DCCH at four places in one frame. However, after generation of the dmch and until transmission of the R-DCCH, an average time delay of 2.5 ms generally occurs, which is ½ of the R-DCCH frame length. Here, to avoid a resync acquisition process at the base station, the mobile station continuously transmits a reverse pilot/PCB channel in the control hold state/normal substate, and a reference value $\theta_1$ used for closed loop power control is maintained to be equal to that in an active state unless the reference value is changed due to outer loop power control which depends on a frame error ratio.

Reference numeral 410 in FIG. 4C represents a case where an R-DCCH is conventionally transmitted within 1.25 ms in maximum after generation of the dmch in the control hold station/normal substate. After generating the dmch, the R-DCCH can be transmitted within 5 ms in maximum. Here, after generation of the dmch and until transmission of the R-DCCH, an average delay time of 0.625 ms occurs. To avoid a resync acquisition process at the base station, the mobile station continuously transmits a reverse pilot/PCB channel in the control hold state/normal substate, and a reference value $\theta_1$ used for closed loop power control is maintained to be equal to that in an active state unless the reference value is changed due to outer loop power control which depends on a frame error ratio.

Reference numerals 500 and 510 of FIG. 5A illustrate a conventional power control method for a reverse pilot/PCB channel when an R-DCCH is not activated in a control hold state/normal substate. For both the forward and reverse links, closed loop power control is performed at the same time periods. Here, to avoid a resync acquisition process at the base station, the mobile station continuously transmits a reverse pilot/PCB channel in the control hold state/normal substate, and a reference value $\theta_1$ used for closed loop power control is maintained to be equal to that in an active state unless the reference value is changed due to outer loop power control which depends on a frame error ratio.

Reference numerals 600 and 610 of FIG. 6A represent a conventional power control method for a reverse pilot/PCB channel when an R-DCCH is activated in the control hold state/normal substate, in the case where the R-DCCH indicated by reference numeral exists every 5 ms in a 20 ms basic frame without overlapping. For both the forward and reverse links, closed loop power control is performed at the same time periods. Here, to avoid a resync acquisition process at the base station, the mobile station continuously transmits a reverse pilot/PCB channel in the control hold state/normal substate, and a reference value $\theta_1$ used for closed loop power control is maintained to be equal to that in an active state unless the reference value is changed due to outer loop power control which depends on a frame error ratio.

As stated above, the conventional method of maintaining a reference value for closed loop power control for the reverse pilot/PCB channel in the control hold state/normal substate is advantageous in that the base station can avoid the resync acquisition procedure and make a fast transition to an active state. However, the conventional method increases interference to the reverse link, causing a reduction in capacity of the reverse link. In addition, for the forward link, closed loop power control is performed at the same speed (or rate) as in the active state, thus causing an increase in interference of the forward link and a decrease in capacity of the forward link due to the reverse power control bits.

SUMMARY OF THE INVENTION

It is, therefore, an object of the present invention to provide a communication device and method for changing a reference value for reverse closed loop power control in a control hold state in a CDMA mobile communication system.

It is another object of the present invention to provide a communication device and method for changing a reverse power control rate in a control hold state in a CDMA mobile communication system.

It is further another object of the present invention to provide a communication device and method for intermittently transmitting a power control command for controlling reverse transmission power in a control hold state in a CDMA mobile communication system.

To achieve the above objects, a base station device for a CDMA communication system includes a controller for changing a reference value for reverse closed loop power control in a control hold state, and a forward dedicated control channel transmitter for transmitting a power control bit for controlling transmission power of a reverse link according to the changed power control reference value.

BRIEF DESCRIPTION OF THE DRAWINGS

The above and other objects, features and advantages of the present invention will become more apparent from the following detailed description when taken in conjunction with the accompanying drawings in which:

FIGS. 4A to 4F are diagrams illustrating methods for transmitting a reverse pilot/PCB channel when a reverse dedicated control channel is activated in a control hold state, according to an embodiment of the present invention;

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

In the embodiment, a frame length is 20 ms and each frame includes 16 power control groups. Thus, each power control group is 1.25 ms and a frame length for a dedicated control channel is 5 ms.

Figure 1A:
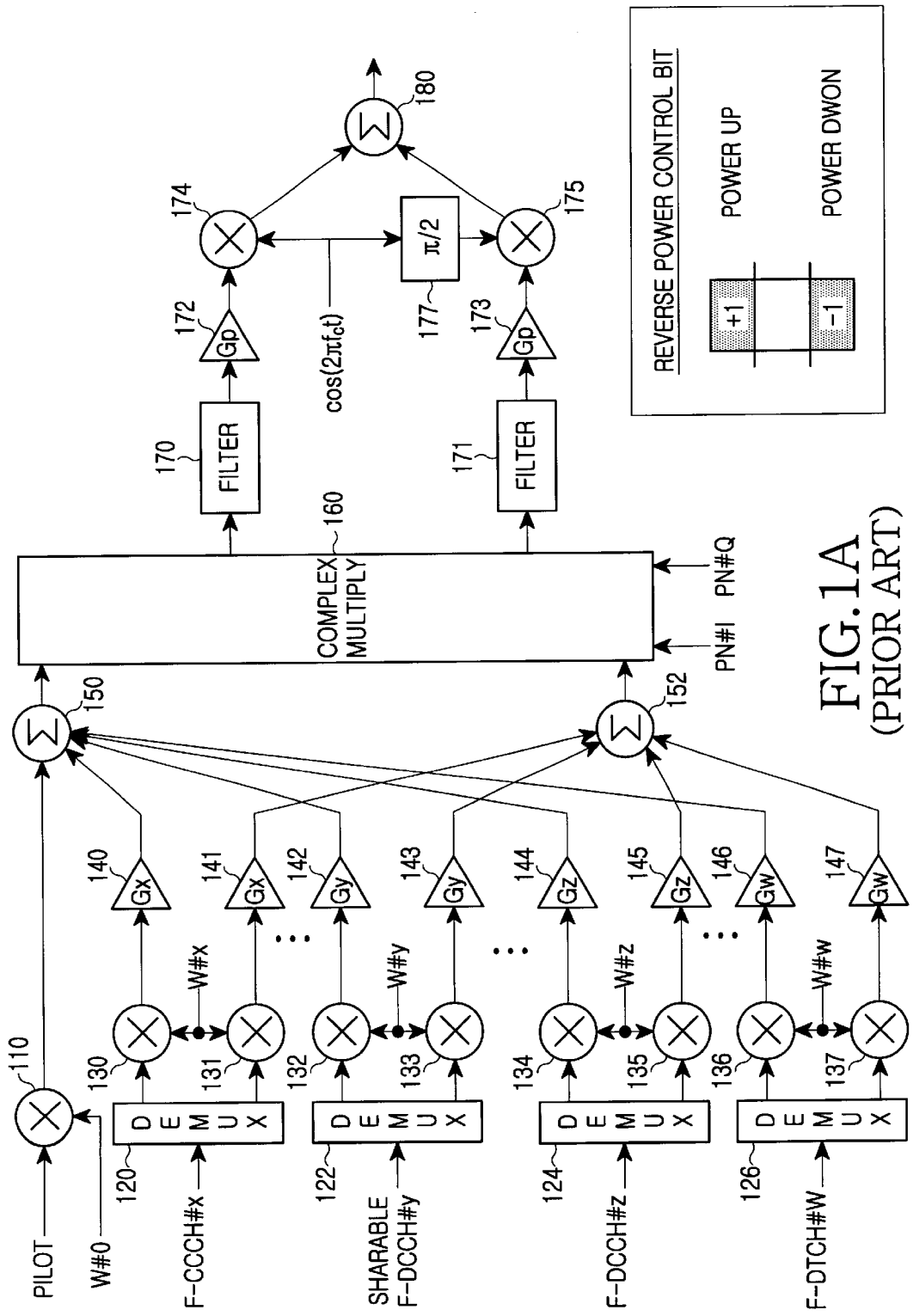
FIG. 1A is a block diagram illustrating a base station transmitter according to the prior art.

A base station transmitter according to the present invention can be implemented in the following two methods depending on a reverse power control rate (or speed). In a first method, a reverse power control command is transmitted by the transmitter as one of three kinds of values (i.e., power-up, power-stay and power-down values). In this method, power control information is changed in the transmitter of FIG. 1A from the existing two kinds of values (i.e., power-up and power-down values) to three values (i.e., power-up, power-stay and power-down values). In a second method, a reverse power control command is transmitted as one of two kinds of values (i.e., i.e., power-up and power-down values) as in the existing method, and a reverse power control rate in the control hold state/normal substate is changed according to a reference value for closed loop power control.

Figure 2:
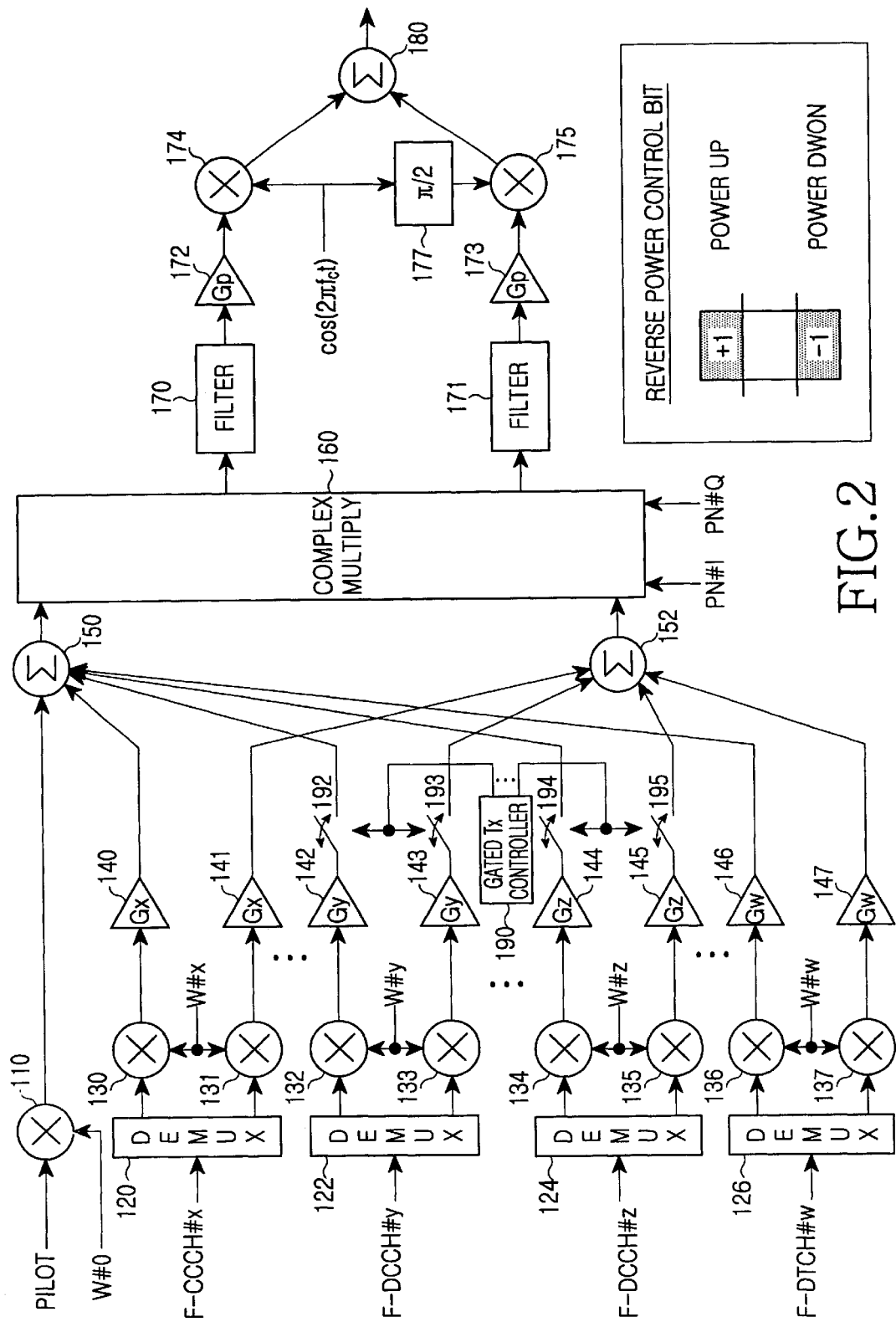
FIG. 2 is a block diagram illustrating a base station transmitter according to an embodiment of the present invention.

The method for transmitting the power control command as three kinds of values is shown in FIG. 2, by way of example. The power control information is comprised of one symbol. To send a power-stay command from a base station to a mobile station, the symbol value is set to "0". Otherwise, the mobile station determines whether to increase or decrease transmission power according to the sign of the transmitted symbol. For example, to send a power-up command from the base station to the mobile station, the symbol value is set to "+1"; and to send a power-down command, the symbol value is set to "−1". In the embodiment of FIG. 2, the power control bit is positive (+) for power-up, negative (−) for power-down, and zero (0) for power-stay. When the power control command has three kinds of values as stated above, the mobile station retains a reference value for determining the "0" value. When a received signal is lower in strength than the reference value, a power control command transmitted from the base station is transmitted as a "0" to maintain transmission power.

A method for reducing the power control rate can be divided into the following two methods. In a first method, conventional power control commands which are generated periodically are intermittently transmitted according to a desired power control rate. In a second method, the conventional power control commands which are generated periodically are grouped, so as to have the grouped power control commands recognized as a single power control command, to thereby decrease the effective power control rate.

Changing a reference value for reverse closed loop power control according to the present invention is performed by a common controller which provides the changed reference value to respective elements so that the reverse power control command is either intermittently transmitted or repeatedly transmitted. Here, performing either intermittent transmission (i.e., gated transmission) or repetitive transmission for the reverse power control command changes the reverse power control rate.

FIG. 2 illustrates a base station transmitter for reducing a reverse power control rate by gated transmission in a control hold state/normal substate according to the present invention. Actual hardware structures for realizing the signal transmission method according to an embodiment the present invention need not be identical to that of FIG. 2. The base station transmitter of FIG. 2 is different from that of FIG. 1A in that a gated transmission controller 190 and gating elements 192–195 perform gated transmission for a reverse power control command as a reverse power control rate for the outputs of amplifiers 142–145 for forward dedicated control channels is changed according to a reference value for closed loop power control. That is, the gated transmission controller 190 allows transmission of a reverse power control bit only at a power control group or time slot scheduled with a mobile station, when the forward and reverse dedicated control channels are not activated in the control hold state/normal substate. To attain a power control rate corresponding to a reference value for closed loop-power control for a reverse channel in the control hold state/normal substate, the gated transmission controller 190 and the gating elements 192–195 transmit a power control command only at the corresponding power control group or time slot.

In the case where the reverse power control rate in the control hold state/normal substate is reduced by repeatedly transmitting a power control command, the base station transmitter has a structure similar to the prior art structure. The only difference is that a generation period of the power control command becomes longer and the generated power control command is repeatedly inserted at the locations where all the power control commands, which exist in the generation period, can be inserted. Since the power control command is repeatedly positioned at plural locations, it is possible to attain a time diversity. Further, from the viewpoint of a time axis, since the power control command exists over a longer time as compared with the gated transmission, it is possible to transmit the power control command with relatively lower transmission power.

Figure 1B:
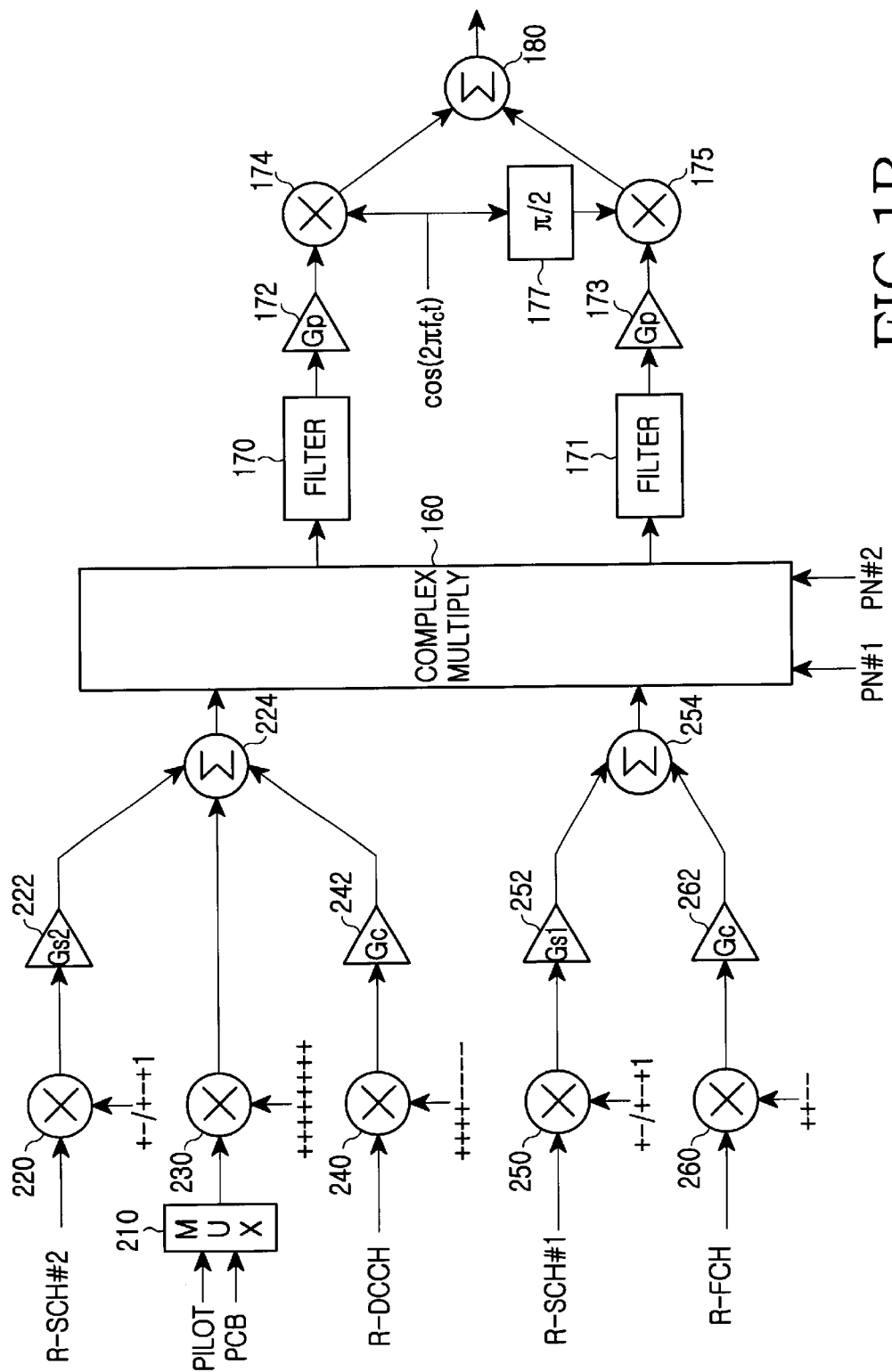
FIG. 1B is a block diagram illustrating a mobile station transmitter according to the prior art.

Though not illustrated, a mobile station transmitter according to the present invention has the same structure as the conventional structure of FIG. 1B, except that the transmission power of a reverse pilot/PCB channel is increased at around the time where a reverse dedicated control channel is activated, as shown in FIGS. 4A–4F and 6A–6G. Here, a scheme for controlling the transmission power of the reverse pilot/PCB channel includes amplifiers 172 and 173 in the mobile station transmitter of FIG. 1B. The mobile station increases or decreases transmission power of the reverse pilot/PCB channel by controlling gains of the amplifiers 172 and 173 according to a power control command from the base station.

A reference will now be made to the structure of transmission signals generated in the base station and mobile station according to an embodiment of the present invention.

Figure 3A:
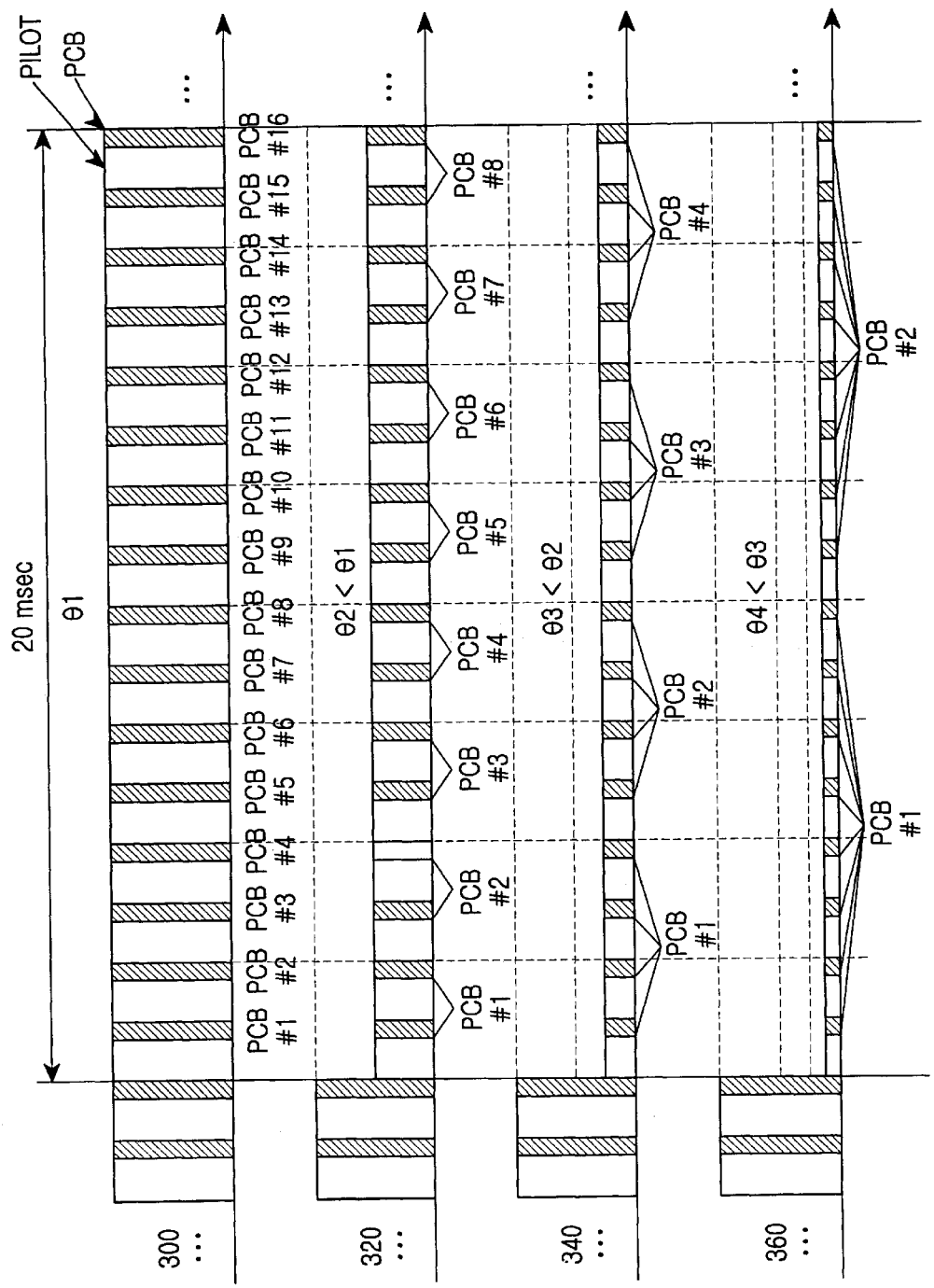
FIGS. 3A and 3B are diagrams illustrating methods for transmitting a reverse pilot/PCB channel in a control hold state according to an embodiment of the present invention.

Reference numerals 320, 340 and 360 of FIG. 3A illustrate methods for decreasing the transmission power of a reverse pilot/PCB channel by changing, at a base station, a reference value for closed loop power control for a reverse channel in the control hold state/normal substate according to an embodiment of the present invention.

The reference numeral 320 shows relative transmission signals on a reverse pilot/PCB channel for the case where the base station has a reference value $\theta_2$ ($<\theta_1$) for closed loop power control for a reverse channel in the control hold state/normal substate. For example, when $\theta_1=(Ec/No)_{required}$, $\theta_2=\theta_1/2=(1/2)\times(Ec/No)_{required}$. A forward power control command reduces a power control rate to ½ by the repetitive transmission method (i.e., transmitting the same power control command more than once). In this case, a mobile station recognizes two successive power control commands as a single forward power control command. Therefore, the mobile station performs power control eight times instead of sixteen for the 20 ms frame duration, thereby reducing the rate by ½.

The reference numeral 340 shows relative transmission signals on a reverse pilot/PCB channel for the case where the base station has a reference value $\theta_3$($<\theta_2<\theta_1$) for closed loop power control for a reverse channel in the control hold state/normal substate. For example, when $\theta_1=(Ec/No)_{required}$, $\theta_3=\theta_22=\theta_1/4=(1/4)\times(Ec/No)_{required}$. A forward power control command reduces a power control rate to ¼ by the repetitive transmission method. That is, a mobile station recognizes four successive power control commands as one forward power control command. Therefore, the mobile station performs power control four times instead of sixteen for the 20 ms frame duration, thereby reducing the rate by ¼.

The reference numeral 360 shows relative transmission signals on a reverse pilot/PCB channel for the case where the base station has a reference value $\theta_4$ ($\theta_3<<\theta_2<\theta_1$) for closed loop power control for a reverse channel in the control hold state/normal substate. For example, when $\theta_1=(Ec/No)_{required}$, $\theta_4=\theta_3/2=\theta_2/4=\theta_1/8=(1/8)\times(Ec/No)_{required}$. A forward power control command reduces a power control rate to ⅛ by the repetitive transmission method. That is, a mobile station recognizes eight power control commands as one forward power control command. Therefore, the mobile station performs power control two times instead of sixteen for the 20 ms frame duration, thereby reducing the rate by ⅛.

Figure 3B:
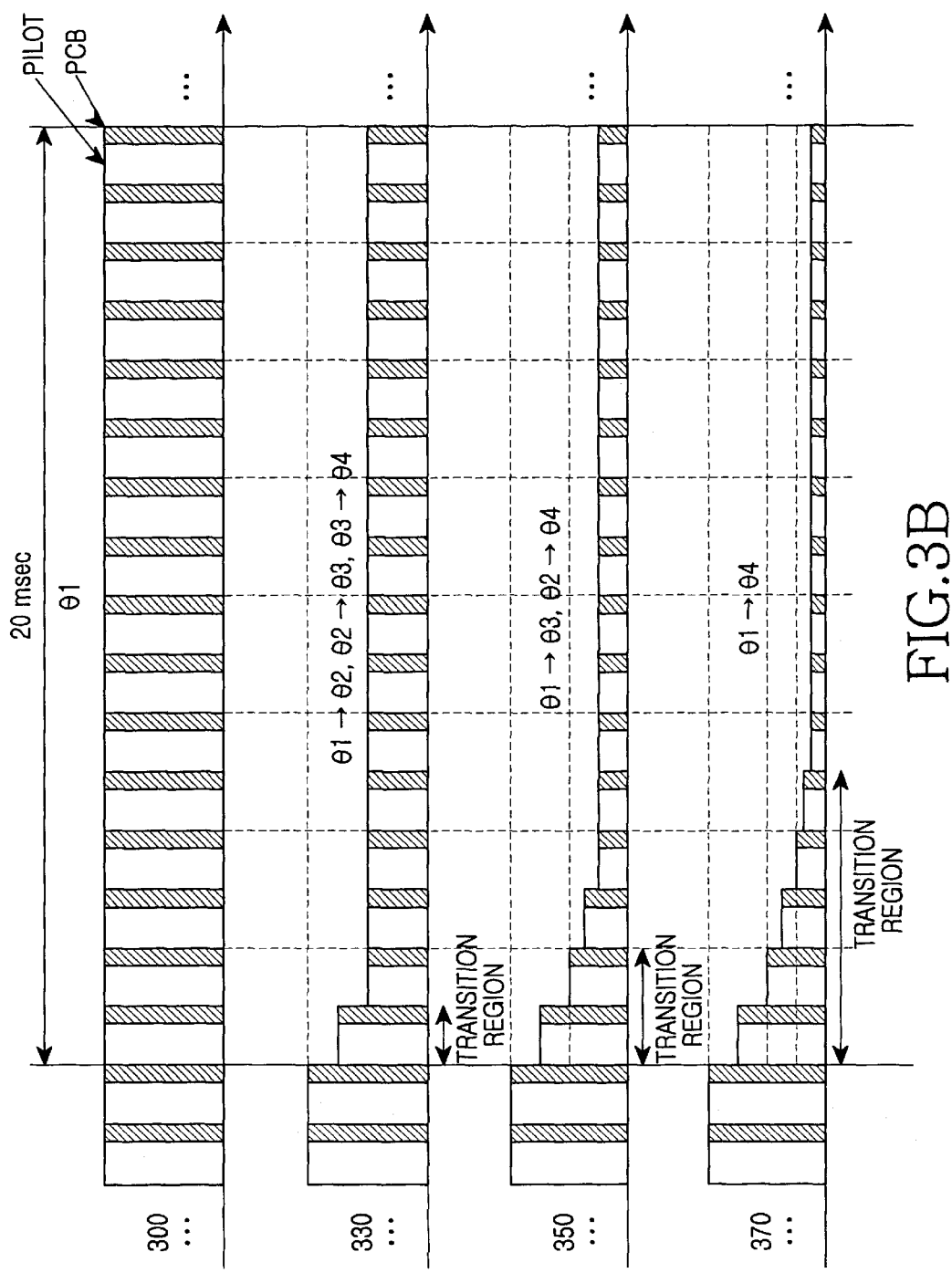

Reference numerals 330, 350 and 370 illustrate cases where transmission power of a reverse pilot/PCB channel enters a transition region by changing, a reference value stored in the base station for closed loop power control for a reverse channel in the control hold state/normal substate according to an embodiment of the present invention. That is, in the case where the base station changes the reference value for closed loop power control, if the mobile station decreases its transmission power at a time where the reference value is changed, there is no separate transition region required as in FIG. 3A. However, when the mobile station controls the transmission power of a reverse channel depending only on a reverse power control command from the base station, a transition region exists. The transition region may vary in length according to the transmission power variation (plus and minus) during closed loop power control and the time where the reference value is changed. For example, in the case where the transmission power variation is 1 dB when the reference value is changed by 3 dB, it needs to receive the command at least three times to reach a desired transmission power level; when the transmission power is 1.5 dB, it is necessary to receive the command at least two times to reach a desired transmission power level. In the embodiment of FIG. 3B; when a power control delay corresponds to one power control group or time slot, a reference value is changed at a fifteenth power control group or time slot of the prior frame, so that transmission power of a mobile station starts to decrease beginning at a first power control group or time slot of a present frame, wherein the transmission power variation is 1.5 dB.

Reference numeral 330 of FIG. 3B shows relative transmission signals on a reverse pilot/PCB channel for the case where the base station changes a reference value for closed loop power control for a reverse channel from $\theta_1$ to $\theta_2$ (or from $\theta_2$ to $\theta_3$ or from $\theta_3$ to $\theta_4$) in the control hold state/normal substate. Reference numeral 350 of FIG. 3B shows relative transmission signals on a reverse pilot/PCB channel for the case where the base station changes a reference value for closed loop power control for a reverse channel from $\theta_1$ to $\theta_3$ (or from $\theta_2$ to $\theta_4$) in the control hold state/normal substate. Reference numeral 370 of FIG. 3B shows relative transmission signals on a reverse pilot/PCB channel for the case where the base station changes a reference value for closed loop power control for a reverse channel from $\theta_1$ to $\theta_4$ in the control hold state/normal substate.

Figure 4B:
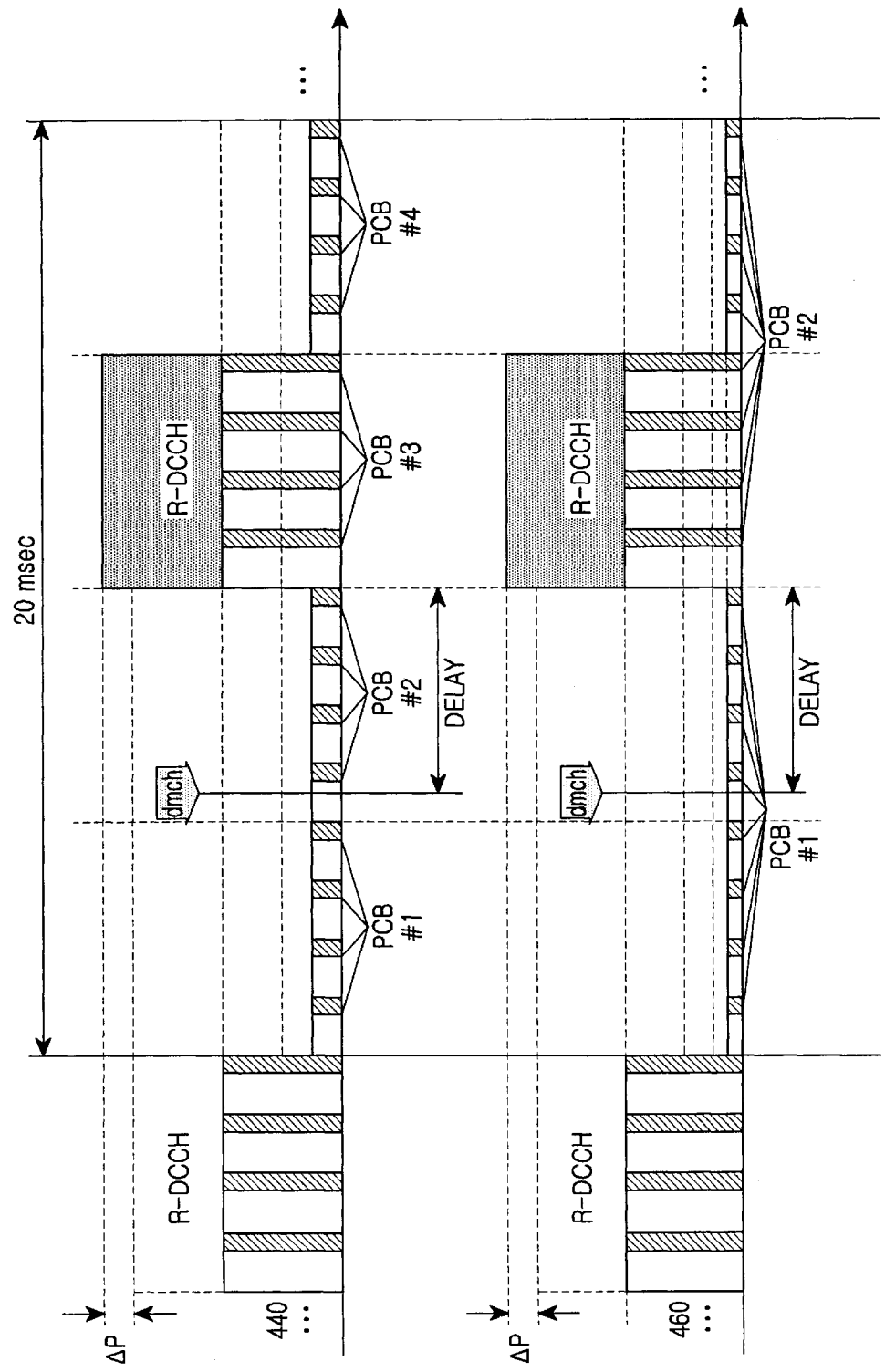

FIGS. 4A and 4B illustrate methods for transmitting a reverse pilot/PCB channel for the case where an R-DCCH having a frame length of 5 ms can exist only at four locations in a 20 ms basic frame as shown by reference numeral 400 of FIG. 4A. Reference numeral 420 of FIG. 4A and reference numerals 440 and 460 of FIG. 4B illustrate a location of the R-DCCH for the case where a dedicated MAC logical channel (dmch) is first generated in the control hold state/normal substate for cases 320 340 and 360 of FIG. 3A and then transmitted through the R-DCCH being a physical channel. A time delay measured from the generation of the dmch and until transmission of the R-DCCH, is 5 ms in maximum and 2.5 ms on the average.

Reference numeral 420 of FIG. 4A shows a transmission signal for the case where an R-DCCH is transmitted due to generation of a dmch when a reference value for closed loop power control is changed to $\theta_2$ in the control hold state/normal substate. A forward power control rate is reduced to ½ the normal power control rate as shown by reference numeral 320 of FIG. 3A. A base station repeatedly transmits a power control command two times, and a mobile station then controls transmission power of a reverse link according to the repeatedly transmitted power control command. The mobile station restores transmission power of the reverse pilot/PCB channel to the normal transmission power for the time interval where the R-DCCH is transmitted. In addition, the transmission power is further increased for the time interval where the R-DCCH is transmitted by a predetermined level ΔP, which can be provided as a system parameter.

The reference numeral 440 of FIG. 4A shows a transmission signal for the case where an R-DCCH is transmitted due to generation of a dmch when a reference value for closed loop power control is changed to $\theta_3$ in the control hold state/normal substate. A forward power control rate is reduced to ¼ the normal power control rate as shown by reference numeral 340 of FIG. 3A. A base station repeatedly transmits a power control command four times, and a mobile station then controls the transmission power of a reverse link according to the repeatedly transmitted power control command. The mobile station restores the transmission power of the reverse pilot/PCB channel to the normal transmission power at the time where the R-DCCH is transmitted. In addition, the R-DCCH is transmitted with a transmission power increased by a predetermined level ΔP, which can be given as a system parameter.

The reference numeral 460 of FIG. 4A shows a transmission signal for the case where an R-DCCH is transmitted due to generation of a dmch when a reference value for closed loop power control is changed to $\theta_4$ in the control hold state/normal substate. A forward power control rate is reduced to ⅛ the normal power control rate as shown by reference numeral 360 of FIG. 3A. A base station repeatedly transmits a power control command eight times, and a mobile station then controls transmission power of a reverse link according to the repeatedly transmitted power control command. The mobile station restores transmission power of the reverse pilot/PCB channel to the normal transmission power for the time intervals where the R-DCCH is transmitted. In addition, the R-DCCH transmission power is further increased for the time interval where the R-DCCH is transmitted by a predetermined level ΔP, which can be given as a system parameter.

FIGS. 4C to 4F illustrate methods for transmitting a reverse pilot/PCB channel for the case where an R-DCCH can exist at sixteen locations in a 20 ms basic frame on a 1.25 ms power control group or time slot unit basis.

Figure 4C:
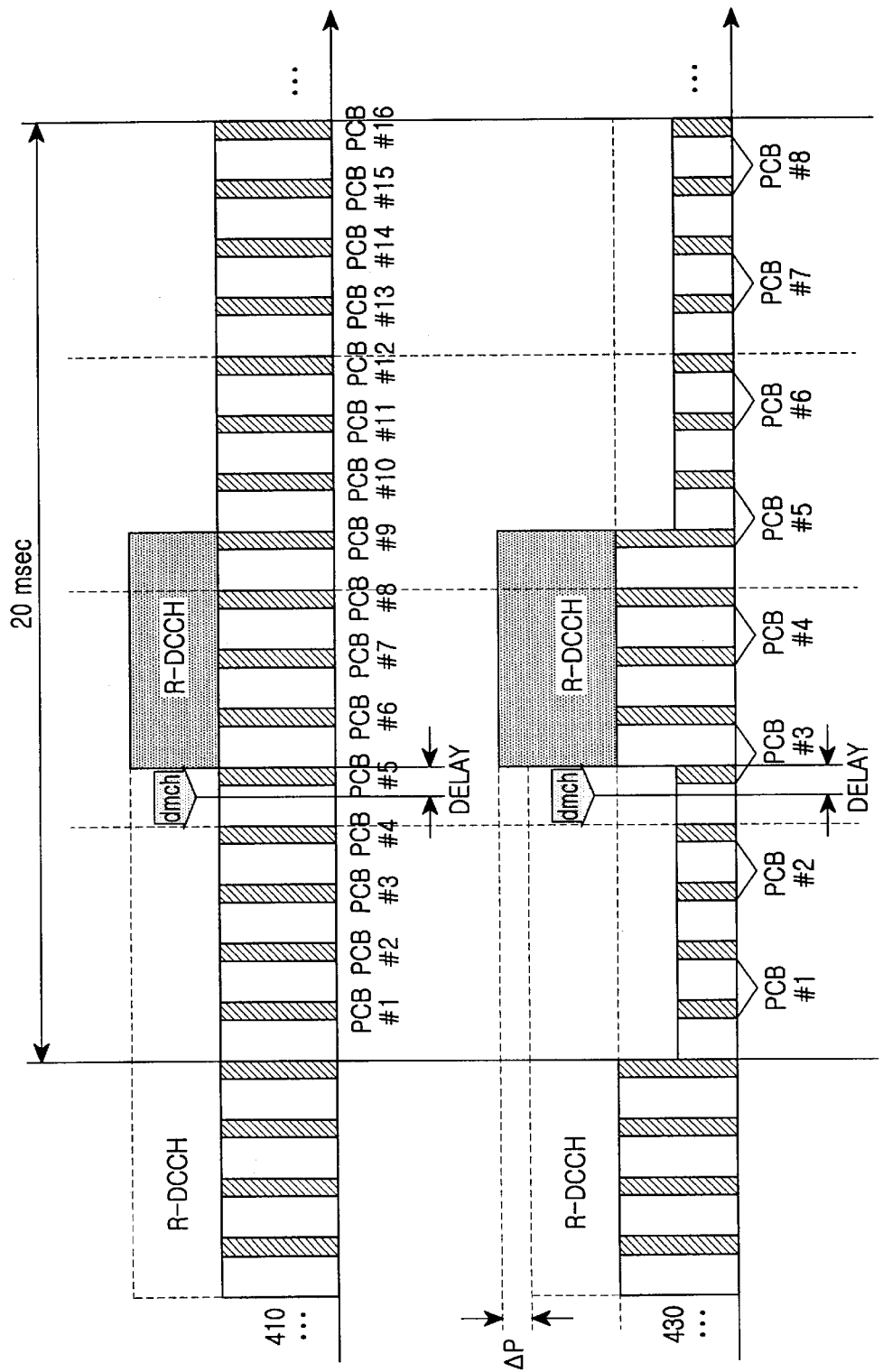
Figure 4D:
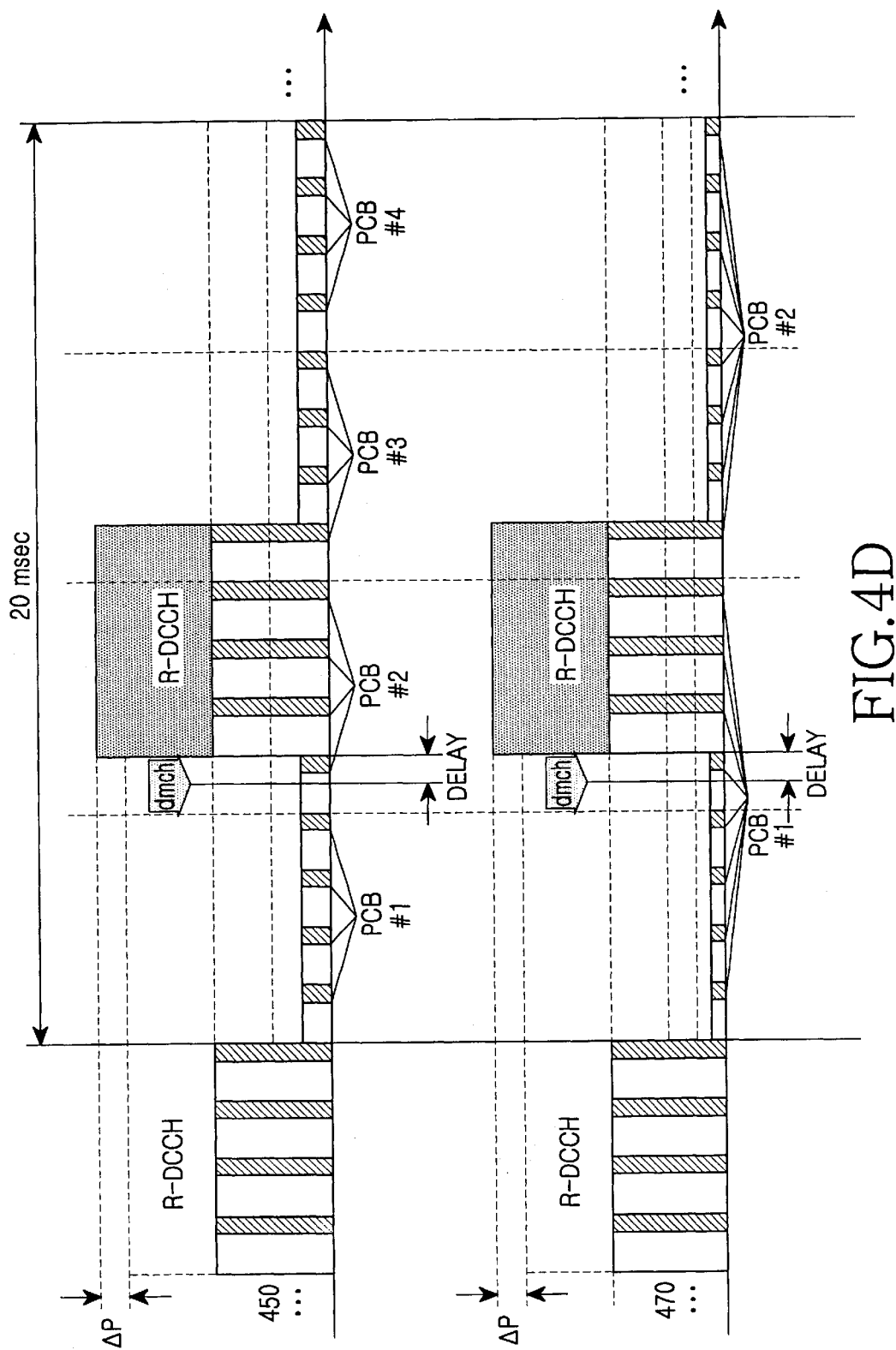

FIGS. 4C and 4D show transmission signals for the case where transmission power of the reverse pilot/PCB channel is increased only at a time where there exists the R-DCCH. The extent of the increased transmission power ΔP is $\theta_1$ [dB]-$\theta_x$[dB] (where x=2, 3, 4). A time delay measured from the generation of a dmch until transmission of the R-DCCH, is 1.25 ms in maximum and 0.625 ms on the average. The R-DCCH is transmitted with a transmission power higher by ΔP than that in the prior art, wherein ΔP can be provided as a system parameter.

Reference numeral 430 of FIG. 4C shows a transmission signal for the case where an R-DCCH is transmitted due to generation of a dmch when a reference value for closed loop power control is changed to $\theta_2$ in the control hold state/normal substate. A forward power control rate is reduced to ½ the power control rate for the case 410 of FIG. 4C, the dmch is generated at a fifth power control group, and the R-DCCH is transmitted at the next, i.e, sixth power control group. The mobile station increases the transmission power of the reverse pilot/PCB channel to the normal transmission power at a time where the R-DCCH is transmitted. For example, the increased transmission power, ΔP, is defined by $\theta_1$ [dB]-$\theta_2$ [dB]. The R-DCCH is transmitted with a transmission power higher by ΔP than case 410 of FIG. 4C, wherein ΔP can be given as a system parameter.

Reference numeral 450 of FIG. 4C shows a transmission signal for the case where an R-DCCH is transmitted due to generation of a dmch when a reference value for closed loop power control is changed to $\theta_3$ in the control hold state/normal substate. A forward power control rate is reduced to ¼ the power control rate for the case 410 of FIG. 4C, the dmch is generated at a fifth power control group, and the R-DCCH is transmitted at the next, i.e, sixth power control group. The mobile station increases the transmission power of the reverse pilot/PCB channel to the normal transmission power at a time interval where the R-DCCH is transmitted. For example, the increased transmission power, ΔP, is defined by $\theta_1$ [dB]-$\theta_3$ [dB]. The R-DCCH is transmitted with a transmission power higher by ΔP than case 410 of FIG. 4C, wherein ΔP can be provided as a system parameter.

Reference numeral 470 of FIG. 4C shows a transmission signal for the case where an R-DCCH is transmitted due to generation of a dmch when a reference value for closed loop power control is changed to $\theta_4$ in the control hold state/normal substate. A forward power control rate is reduced to ⅛ the power control rate of case 410 of FIG. 4C, the dmch is generated at a fifth power control group, and the R-DCCH is transmitted at the next, i.e, sixth power control group. The mobile station increases transmission power of the reverse pilot/PCB channel to the normal transmission power at a time interval where the R-DCCH is transmitted. For example, the increased transmission power, ΔP, is defined by $\theta_1$ [dB]-$\theta_4$ [dB]. The R-DCCH is transmitted with a transmission power higher by ΔP than case 410 of FIG. 4C, wherein ΔP can be provided as a system parameter.

Figure 4E:
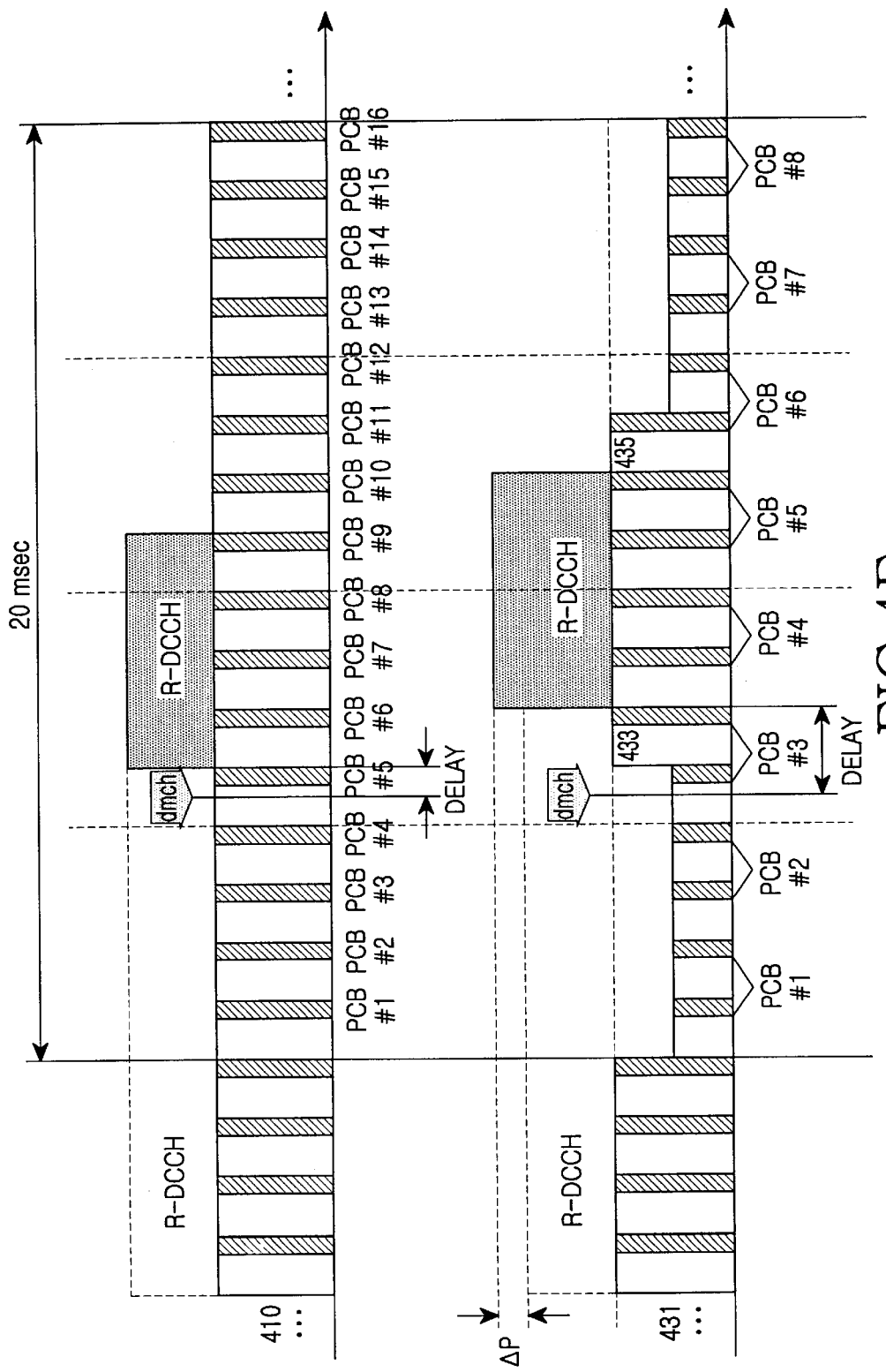
Figure 4F:
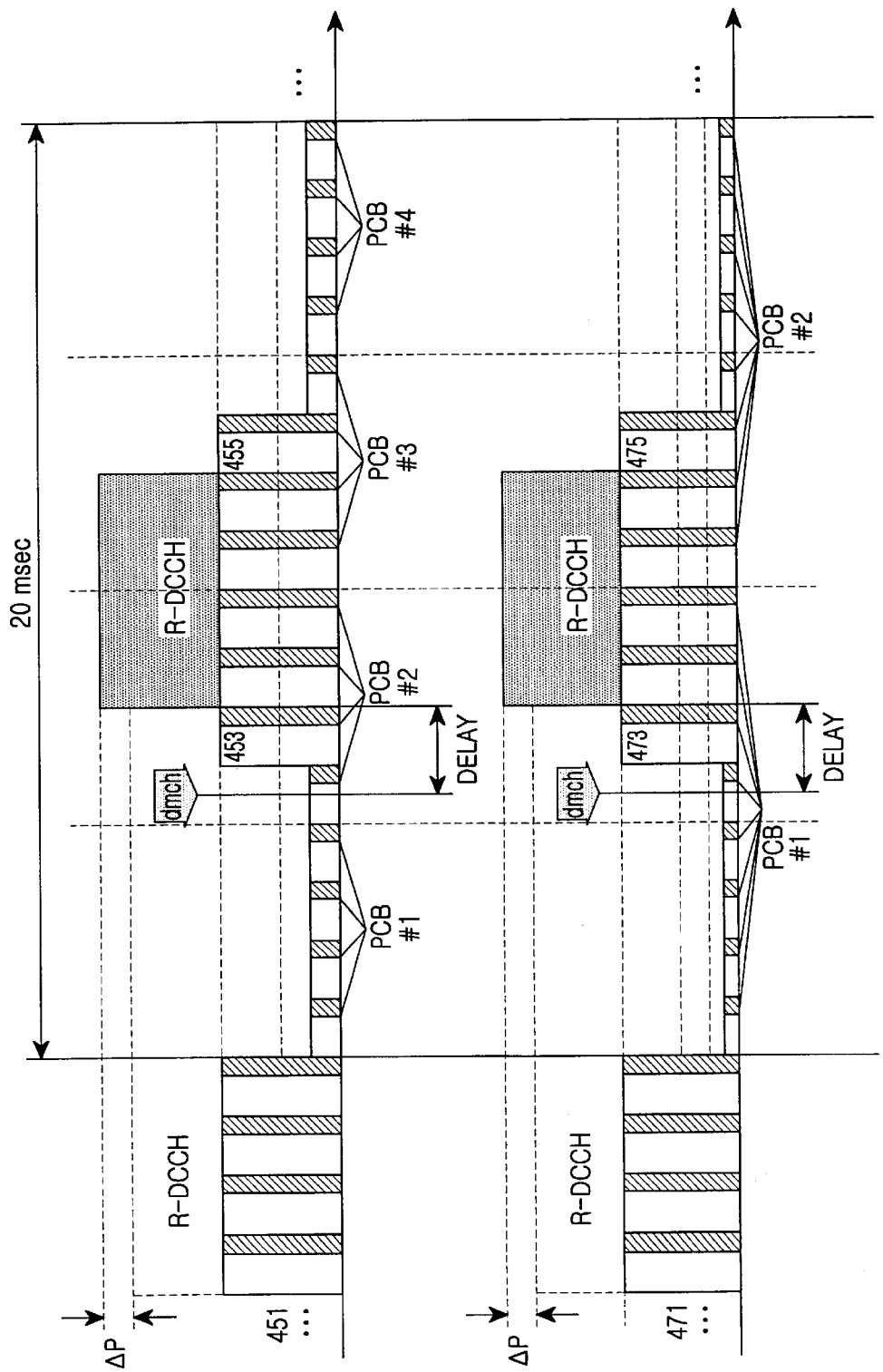

FIGS. 4E and 4F show transmission signals for the case where a mobile station increases transmission power of the reverse pilot/PCB channel from F ($\geq 1$) power control groups or time slots before a duration where there exists the R-DCCH to B ($\geq 1$) power control groups or time slots after the time interval where R-DCCH is transmitted. For example, the extent of the increased transmission power is $\theta_1$ [dB]-$\theta_x$ [dB] (where x==2, 3, 4). The parameters F and B can be provided as system parameters. An increase in transmission power of the reverse pilot/PCB channel at the additional power control groups or time slots assists channel estimation at a base station, to secure correct sync demodulation. A time delay occurring after generation of a dmch and until transmission of the R-DCCH, is (1+F)×1.25 ms in maximum and (1+F)×0.625 ms on the average. The R-DCCH is transmitted with a transmission power higher by ΔP than that in the prior art, wherein ΔP can be provided as a system parameter.

Reference numeral 431 of FIG. 4E shows a transmission signal for the case where an R-DCCH is transmitted due to generation of a dmch when a reference value for closed loop power control is changed to $\theta_2$ in the control hold state/normal substate, wherein F=1 and B=1. A forward power control rate is reduced to ½ the power control rate of case 410 of FIG. 4E, the dmch is generated at a fifth power control group, and the R-DCCH is transmitted at a seventh power control group. The mobile station increases the transmission power of the reverse pilot/PCB channel to the normal transmission power for the time interval where the R-DCCH is transmitted, including one power control group before and after the above time interval. The increased transmission power, ΔP, is defined by $\theta_1$ [dB]-$\theta_2$ [dB]. The R-DCCH is transmitted with a transmission power higher by ΔP than case 410 of FIG. 4E, wherein ΔP can be provided as a system parameter.

Reference numeral 451 of FIG. 4F shows a transmission signal for the case where an R-DCCH is transmitted due to generation of a dmch when a reference value for closed loop power control is changed to $\theta_3$ in the control hold state/normal substate, wherein F=1 and B=1. A forward power control rate is reduced to ¼ the power control rate of case 410 of FIG. 4E, the dmch is generated at a fifth power control group, and the R-DCCH is transmitted at a seventh power control group. The mobile station increases transmission power of the reverse pilot/PCB channel to the normal transmission power at the time interval where the R-DCCH is transmitted, including one power control group before and after the above time interval. The extent of the increased transmission power is $\theta_1$ [dB]-$\theta_3$ [dB]. The R-DCCH is transmitted with a transmission power higher by ΔP than case 410 of FIG. 4E, wherein ΔP can be provided as a system parameter.

Reference numeral 471 of FIG. 4F shows a transmission signal for the case where an R-DCCH is transmitted due to generation of a dmch when a reference value for closed loop power control is changed to $\theta_4$ in the control hold state/normal substate, wherein F=1 and B=1. A forward power control rate is reduced to ⅛ the power control rate of case 410 of FIG. 4E, the dmch is generated at a fifth power control group, and the R-DCCH is transmitted at a seventh power control group. The mobile station increases the transmission power of the reverse pilot/PCB channel to the normal transmission power at a time interval where the R-DCCH is transmitted, including one power control group before and after the above time interval. The extent of the increased transmission power ΔP is $\theta_1$ [dB]-$\theta_4$ [dB]. The R-DCCH is transmitted with a transmission power higher by ΔP than case 410 of FIG. 4E, wherein ΔP can be provided as a system parameter.

Figure 5A:
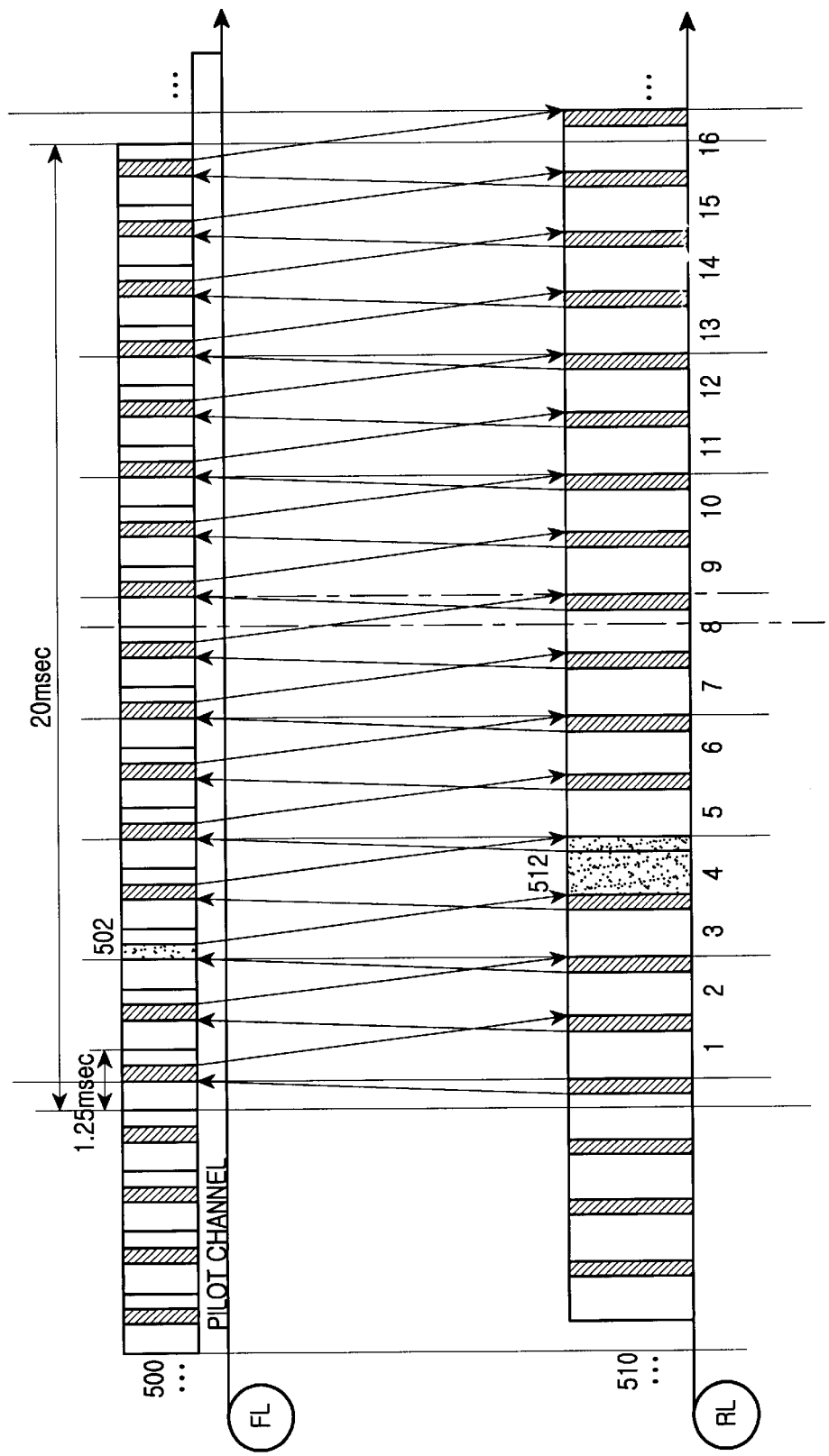
FIGS. 5A to 5D are diagrams illustrating method for controlling transmission power of a reverse pilot/PCB channel in a control hold state according to an embodiment of the present invention.
Figure 5B:
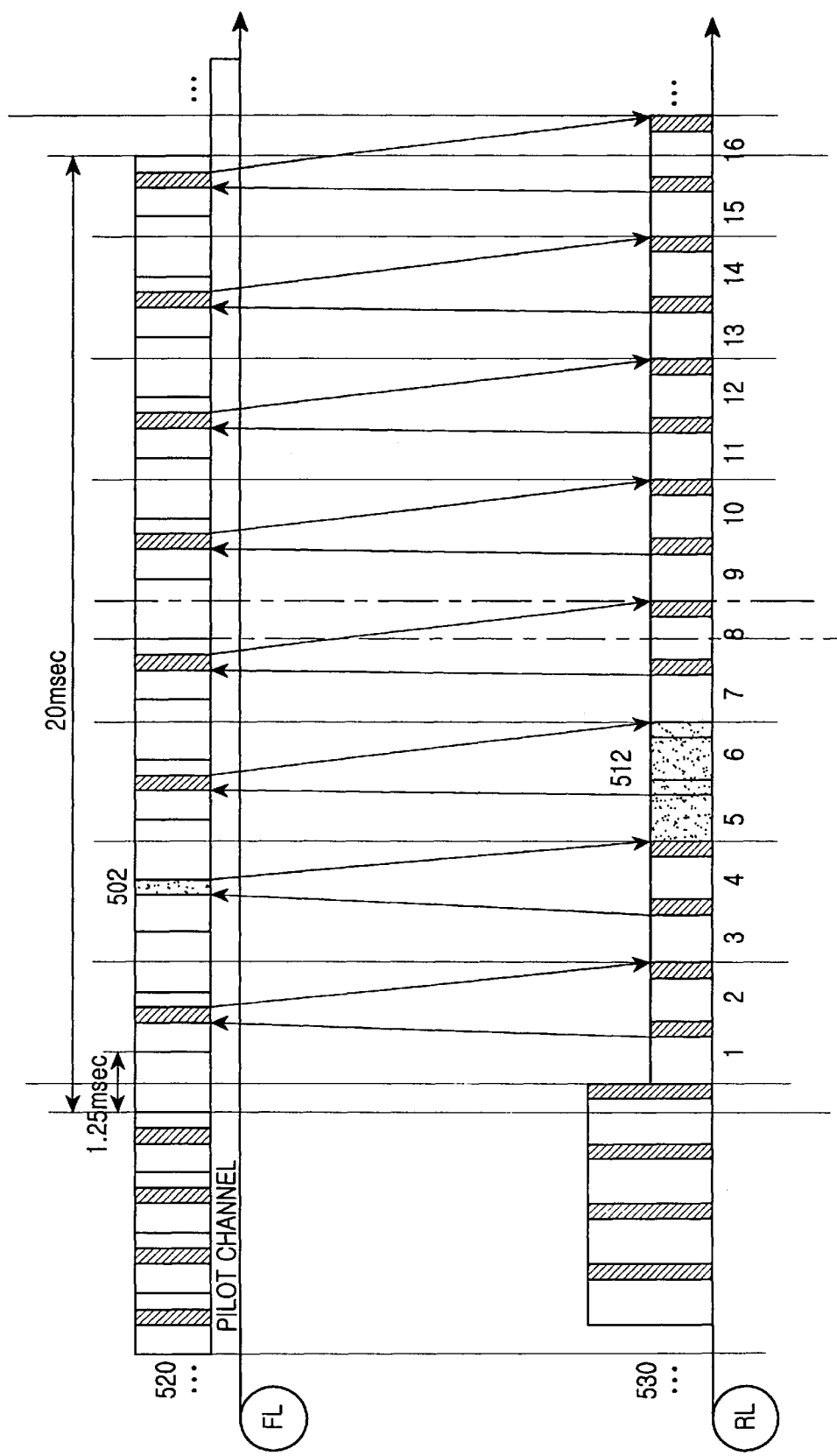
Figure 5C:
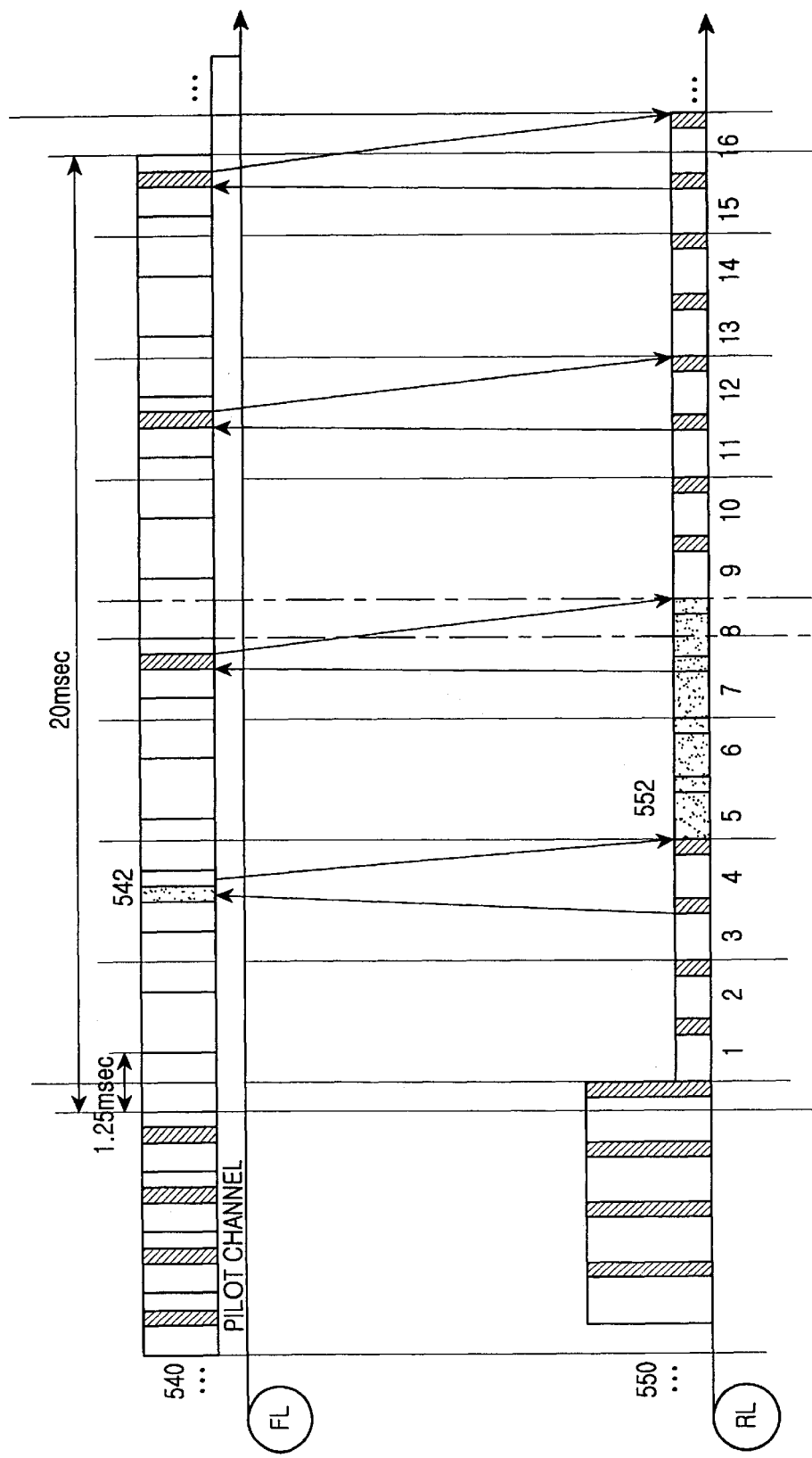
Figure 5D:
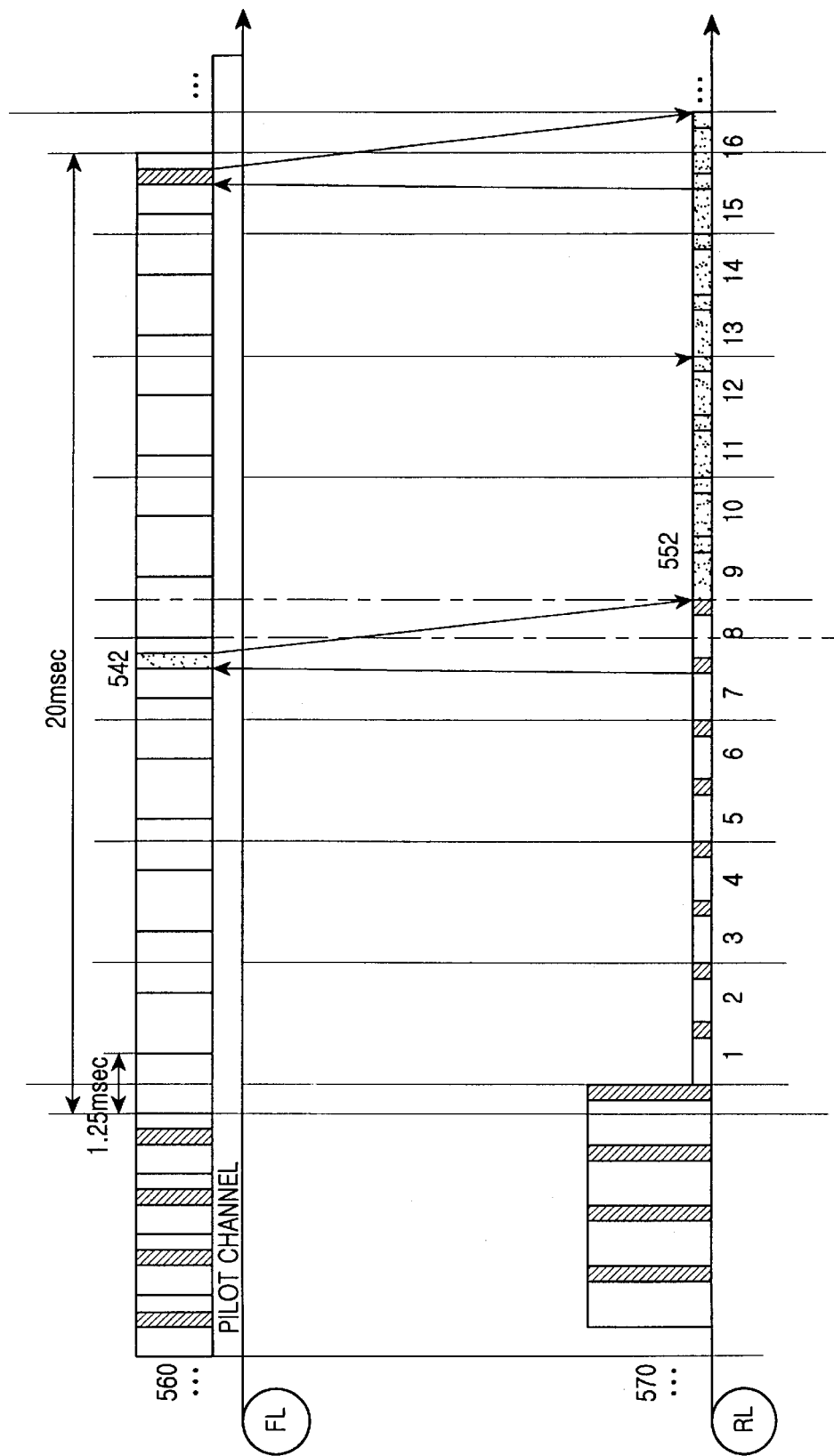

FIGS. 5B to 5D illustrate closed loop power control for the case where a reverse dedicated control channel (R-DCCH) is not activated in the control hold state/normal substate according to an embodiment of the present invention.

FIG. 5B illustrates closed loop power control for the case where a reference value for closed power control is changed to $\theta_2$ ($<\theta_1$) and the R-DCCH is not activated in the control hold state/normal substate. Compared with FIG. 5A, a reverse closed loop power control rate is reduced to ½ by the gated transmission method. It is also possible to reduce the reverse closed loop power control rate to ½ as compared with that of FIG. 5A by the repetitive transmission method. Although FIG. 5B illustrates a ping-pong diagram for reverse closed loop power control, the same ping-pong diagram applies to forward closed loop power control. The reverse power control command or the forward pilot channel can be used in measuring the strength of a forward signal for forward closed loop power control.

FIG. 5C illustrates closed loop power control for the case where a reference value for closed power control is changed to $\theta_3$ ($<\theta_2<\theta_1$) and the R-DCCH is not activated in the control hold state/normal substate. Compared with FIG. 5A, a reverse closed loop power control rate is reduced to ¼ by the gated transmission method. It is also possible to reduce the reverse closed loop power control rate to ¼ as compared with that of FIG. 5A by the repetitive transmission method. Although FIG. 5C illustrates a ping-pong diagram for reverse closed loop power control, the same ping-pong diagram applies to forward closed loop power control. The reverse power control command or the forward pilot channel can be used in measuring the strength of a forward signal for forward closed loop power control.

FIG. 5D illustrates closed loop power control for the case where a reference value for closed power control is changed to $\theta_4$ ($<\theta_3<\theta_2<\theta_1$) and the R-DCCH is not activated in the control hold state/normal substate. Compared with that of FIG. 5A, a reverse closed loop power control rate is reduced to ⅛ by the gated transmission method. It is also possible to reduce the reverse closed loop power control rate to ⅛ as compared with that of FIG. 5A by the repetitive transmission method. Although FIG. 5D illustrates a ping-pong diagram for reverse closed loop power control, the same ping-pong diagram applies to forward closed loop power control. The reverse power control command or the forward pilot channel can be used in measuring strength of a forward signal for forward closed loop power control.

FIGS. 6B to 6G illustrate closed loop power control for the case where a reverse dedicated control channel (R-DCCH) is activated in the control hold state/normal substate according to an embodiment of the present invention.

Figure 6A:
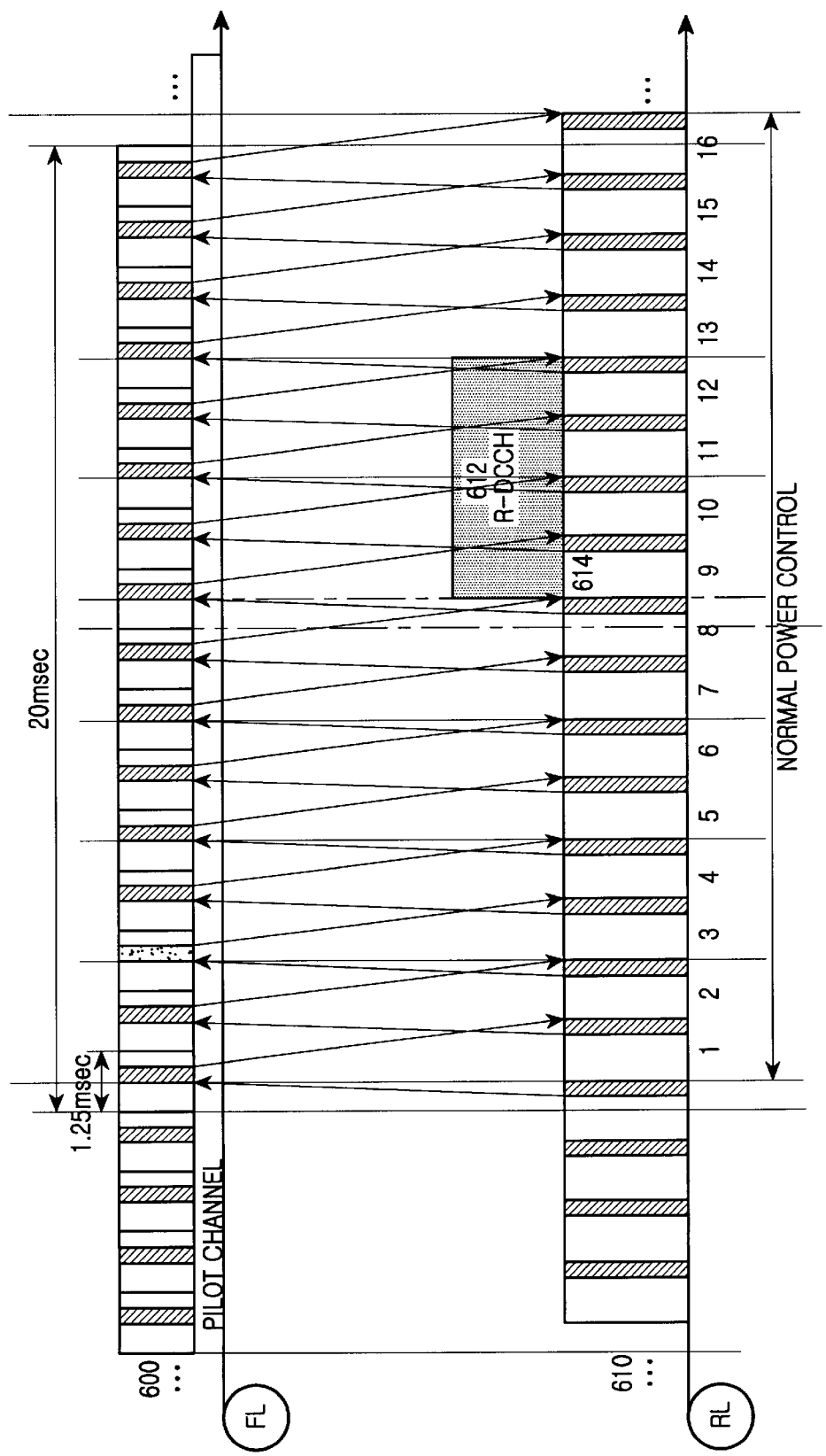
FIGS. 6A to 6F are diagrams illustrating methods for controlling transmission power of a reverse pilot/PCB channel when a reverse dedicated control channel is activated in a control hold state, according to an embodiment of the present invention.
Figure 6B:
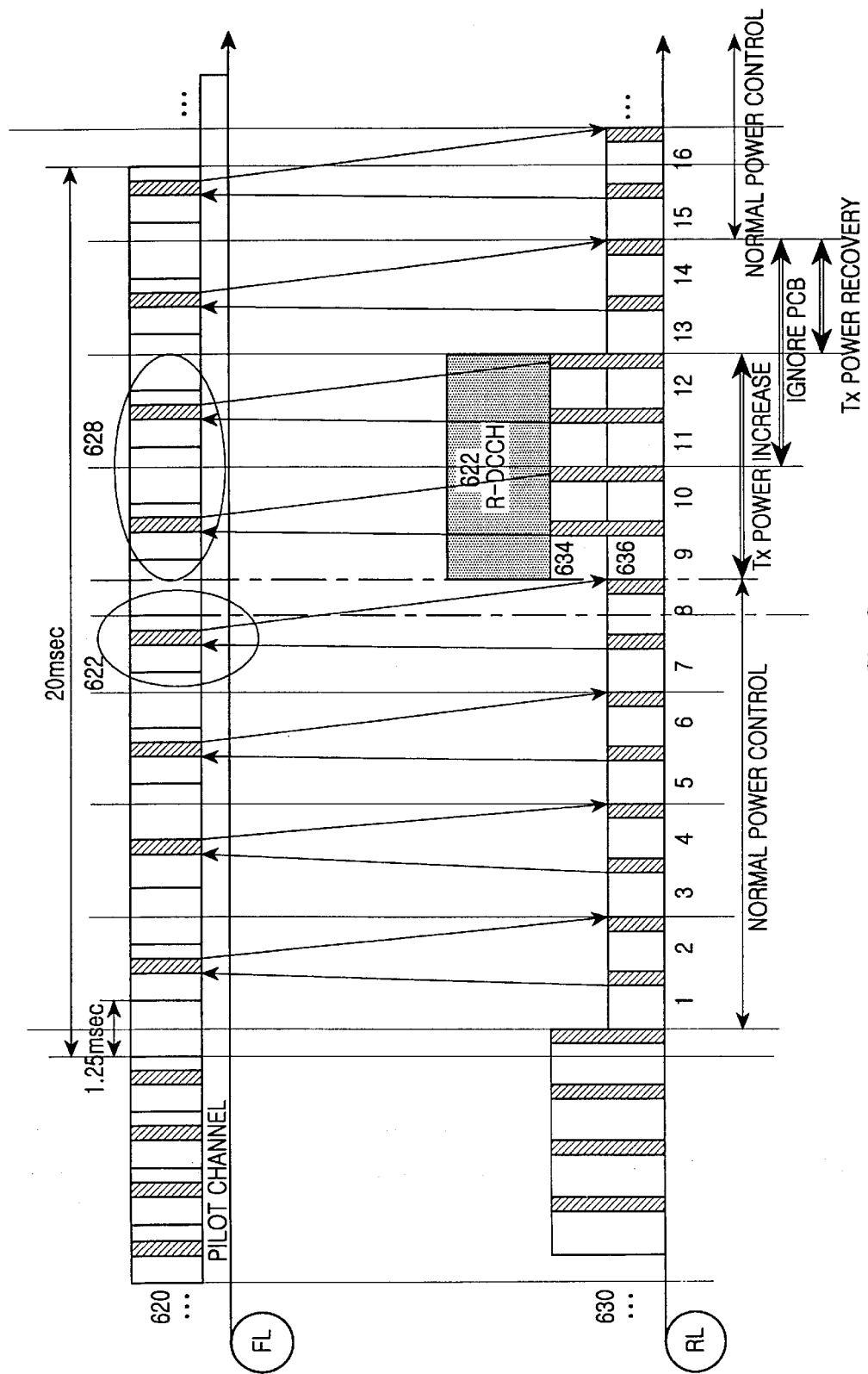
Figure 6C:
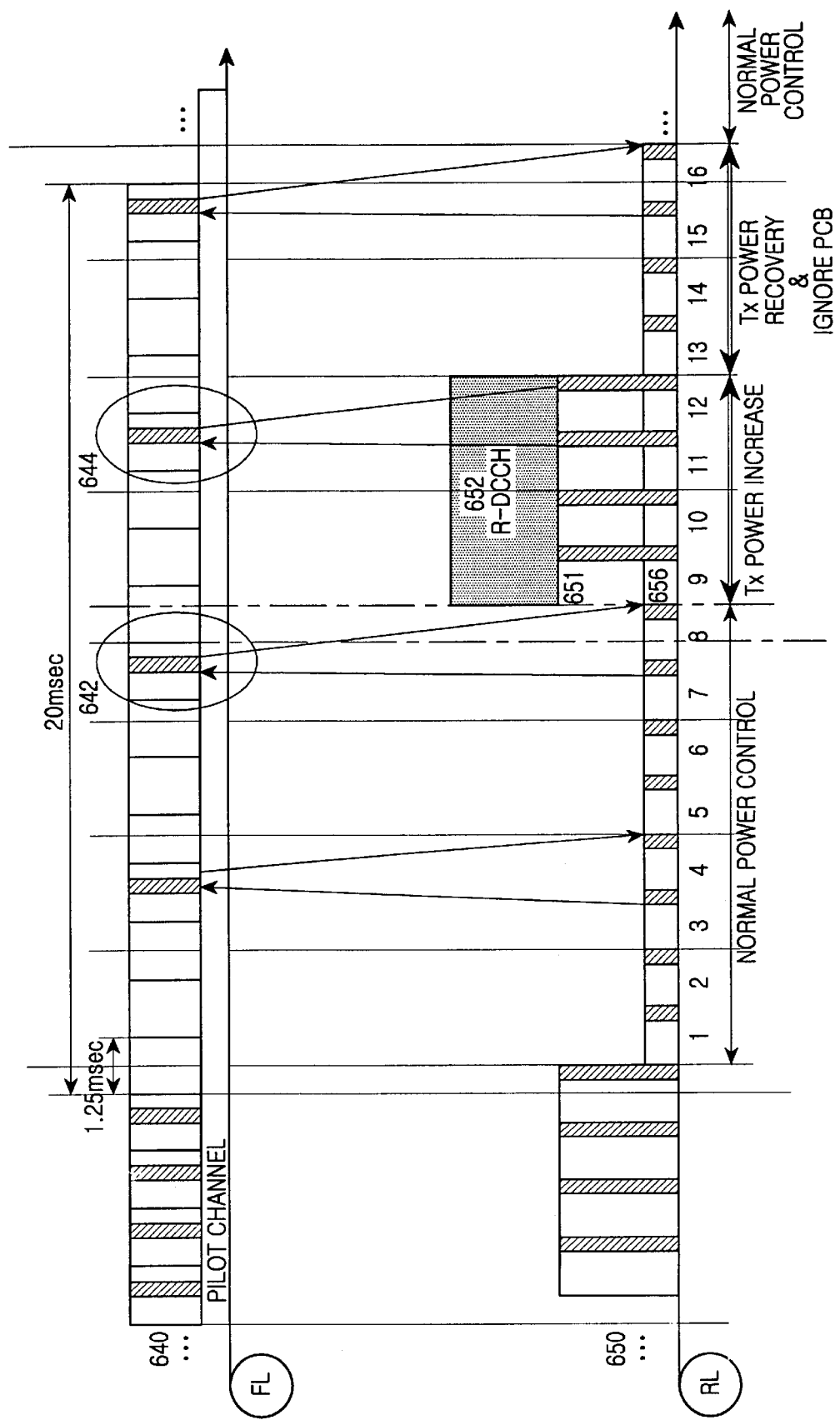
Figure 6D:
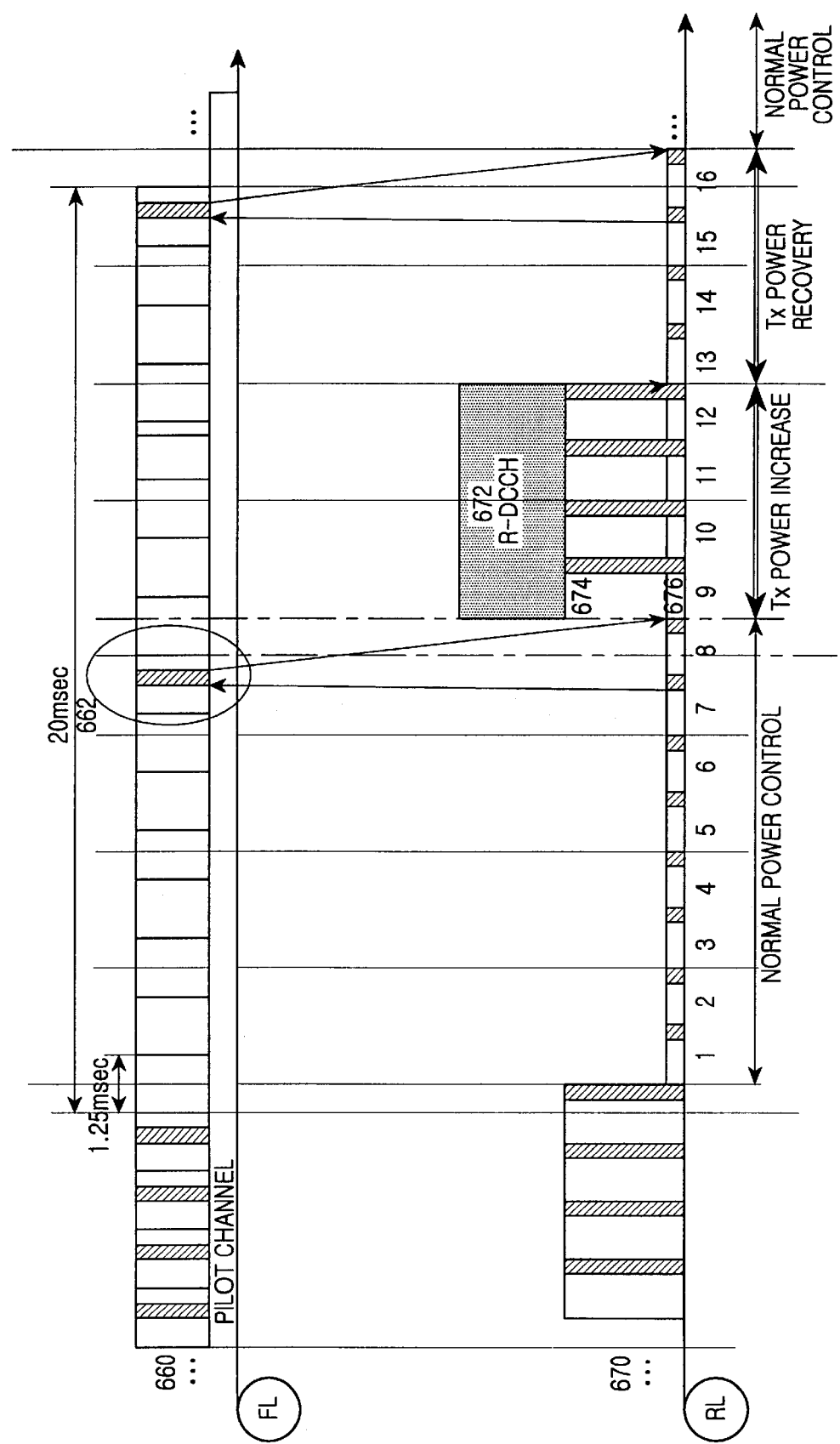

FIGS. 6B to 6D illustrate closed loop power control for the case where the transmission power of a reverse pilot/PCB channel is increased by $\theta_1$ [dB]-$\theta_x$ [dB] (where x=2, 3, 4) only for the time interval where the R-DCCH is activated in the control hold state/normal substate.

FIG. 6B illustrates closed loop power control for the case where a reference value for closed power control is changed to $\theta_2$ ($<\theta_1$) and the R-DCCH is activated in the control hold state/normal substate. Compared with that of FIG. 6A, a reverse closed loop power control rate is reduced to ½ by the gated transmission method. It is also possible to reduce the reverse closed loop power control rate to ½ as compared with that of FIG. 6A by the gated transmission method. Although FIG. 6B illustrates a ping-pong diagram for reverse closed loop power control, the same ping-pong diagram applies to forward closed loop power control. The reverse power control command or the forward pilot channel can be used in measuring strength of a forward signal for forward closed loop power control. A reverse power control command represented by reference numeral 622 controls transmission power represented by reference numeral 636. Transmission power of the power controlled reverse pilot/PCB channel is maintained at a reference value for a duration where the R-DCCH is activated, and becomes a reference value for initial transmission power of the reverse pilot/PCB channel after termination of the duration where the R-DCCH is activated. After termination of the R-DCCH, reverse closed loop power control is performed based on the initial transmission power of the reverse pilot/PCB channel due to activation of the R-DCCH. A mobile station does not perform a normal power control process in response to a reverse power control command that a base station has generated and transmitted on the basis of an increase in the transmission power of the reverse pilot/PCB channel. Transmission power of the reverse pilot/PCB channel is instead increased by an amount $\theta_1$ [dB]-$\theta_2$ [dB] based on the controlled transmission power represented by reference numeral 636, as represented by reference numeral 634. Transmission power of the R-DCCH, shown by reference numeral 632, is higher by ΔP than case 612 of FIG. 6A, wherein ΔP can be provided as a system parameter. Two reverse power control commands represented by reference numeral 628, which are generated on the basis of the reverse pilot/PCB channel whose transmission power is increased at a duration 632 where the R-DCCH is activated, are basically neglected in the mobile station. This is because the mobile station has increased the transmission power of the reverse pilot/PCB channel to assist a base station to effectively receive the R-DCCH, and the base station performs power control not on the basis of a reference value $\theta_1$ but a reference value $\theta_2$ ($<\theta_1$) since it is not possible to know whether the R-DCCH is activated or not at the time interval where the R-DCCH is activated, so that a power-down command will be received unless the mobile station undergoes abrupt fading. When the reverse power control command corresponds to a power-up command, the mobile station can increase transmission power thereof according to the reverse power control command, and whether the system will accept the power-up command is determined in the system design process.

FIG. 6C illustrates closed loop power control for the case where a reference value for closed power control is changed to $\theta_3$ ($<\theta_2<\theta_1$) and the R-DCCH is activated in the control hold state/normal substate. Compared with that of FIG. 6A, a reverse closed loop power control rate is reduced to ¼ by the gated transmission method. It is also possible to reduce the reverse closed loop power control rate to ¼ as compared with that of FIG. 6A by the repetitive transmission method. Although FIG. 6C illustrates a ping-pong diagram for reverse closed loop power control, the same ping-pong diagram applies to forward closed loop power control. The reverse power control command or the forward pilot channel can be used in measuring the strength of a forward signal for forward closed loop power control. A reverse power control command represented by reference numeral 642 controls transmission power represented by reference numeral 656. Transmission power of the power controlled reverse pilot/PCB channel is maintained at a reference level for the time interval where the R-DCCH is activated, and becomes a reference value for initial transmission power of the reverse pilot/PCB channel after termination of the time interval where the R-DCCH is activated. After termination of the R-DCCH, reverse closed loop power control is performed based on the initial transmission power of the reverse pilot/PCB channel due to activation of the R-DCCH. A mobile station does not perform a normal power control process in response to a reverse power control command that a base station has generated and transmitted on the basis of an increased transmission power of the reverse pilot/PCB channel. Transmission power of the reverse pilot/PCB channel is increased by $\theta_1$ [dB]-$\theta_3$ [dB] based on the controlled transmission power represented by reference numeral 656, as represented by reference numeral 654. Transmission power of the R-DCCH, shown by reference numeral 652, is higher by ΔP than case 612 of FIG. 6A, wherein ΔP can be provided as a system parameter. A single reverse power control command represented by reference numeral 644, which is generated on the basis of the reverse pilot/PCB channel whose transmission power is increased at the time interval 652 where the R-DCCH is activated, is basically neglected in the mobile station. This is because the mobile station has increased the transmission power of the reverse pilot/PCB channel to assist a base station to effectively receive the R-DCCH, and the base station performs power control on the basis of a reference value $\theta_1$ but a reference value $\theta_3$ ($<\theta_1$) since it is not possible to know whether the R-DCCH is activated or not at the time interval where the R-DCCH is scheduled to be activated, so that a power-down command will be received unless the mobile station undergoes abrupt fading. When the reverse power control command corresponds to a power-up command, the mobile station can increase transmission power thereof according to the reverse power control command, and whether the system will accept the power-up command is determined in the system design process.

FIG. 6D illustrates closed loop power control for the case where a reference value for closed power control is changed to $\theta_4$ ($<\theta_3<\theta_2<\theta_1$) and the R-DCCH is activated in the control hold state/normal substate compared with that of FIG. 6A. A reverse closed loop power control rate is reduced to ⅛ by the gated transmission method. It is also possible to reduce the reverse closed loop power control rate to ⅛ as compared with that of FIG. 6A by the repetitive transmission method. Although FIG. 6D illustrates a ping-pong diagram for reverse closed loop power control, the same ping-pong diagram applies to forward closed loop power control. The reverse power control command or the forward pilot channel can be used in measuring the strength of a forward signal for forward closed loop power control. A reverse power control command represented by reference numeral 662 controls transmission power represented by reference numeral 676. Transmission power of the power controlled reverse pilot/PCB channel is maintained at a reference level for the time interval where the R-DCCH is activated, and becomes a reference value for initial transmission power of the reverse pilot/PCB channel after termination of the time interval where the R-DCCH is activated. After termination of the R-DCCH, reverse closed loop power control is performed based on the initial transmission power of the reverse pilot/PCB channel. Due to activation of the R-DCCH, a mobile station does not perform a normal power control process for a reverse power control command that a base station has generated and transmitted on the basis of an increased transmission power of the reverse pilot/PCB channel. Transmission power of the reverse pilot/PCB channel is increased by $\theta_1$ [dB]-$\theta_4$ [dB] based on the controlled transmission power represented by reference numeral 676, as represented by reference numeral 674. Transmission power of the R-DCCH, shown by reference numeral 672, is higher in level by $\Delta P$ than case 612 of FIG. 6A, wherein $\Delta P$ can be provided as a system parameter. A reverse power control command (which does not exist in the embodiment of FIG. 6D) generated on the basis of the reverse pilot/PCB channel whose transmission power is increased at a time interval 672 where the R-DCCH is activated, is basically neglected in the mobile station. This is because the mobile station has increased transmission power of the reverse pilot/PCB channel to assist a base station to effectively receive the R-DCCH, and the base station performs power control not on the basis of a reference value $\theta_1$ but a reference value $\theta_4$ ($<\theta_1$) since it is not possible to know whether the R-DCCH is activated or not at the time interval where the R-DCCH is scheduled to be activated, so that a power-down command will be received unless the mobile station undergoes abrupt fading. When the reverse power control command corresponds to a power-up command, the mobile station can increase transmission power thereof according to the reverse power control command, and whether the system will accept the power-up command is determined in the system design process.

Figure 6E:
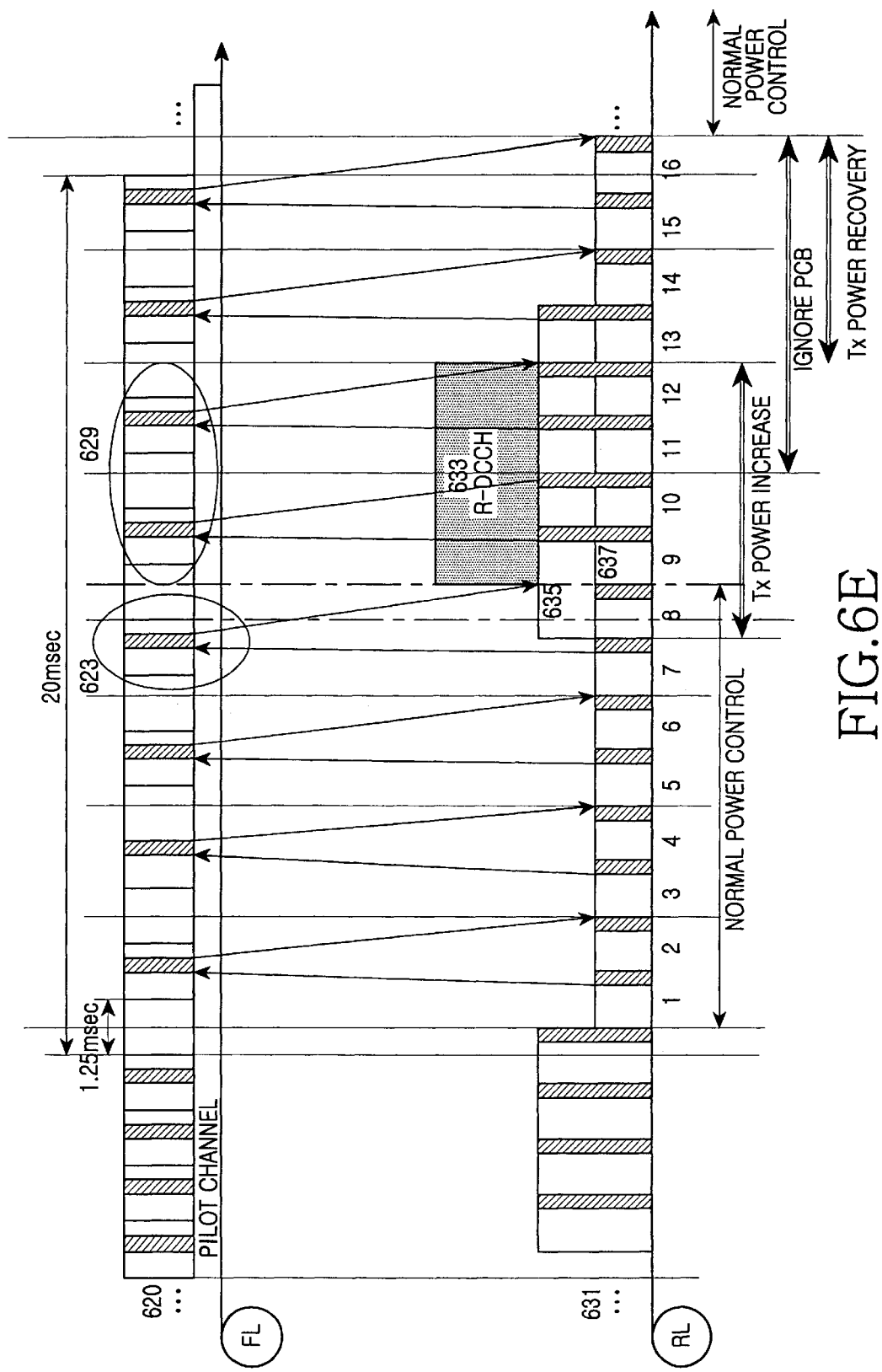
Figure 6F:
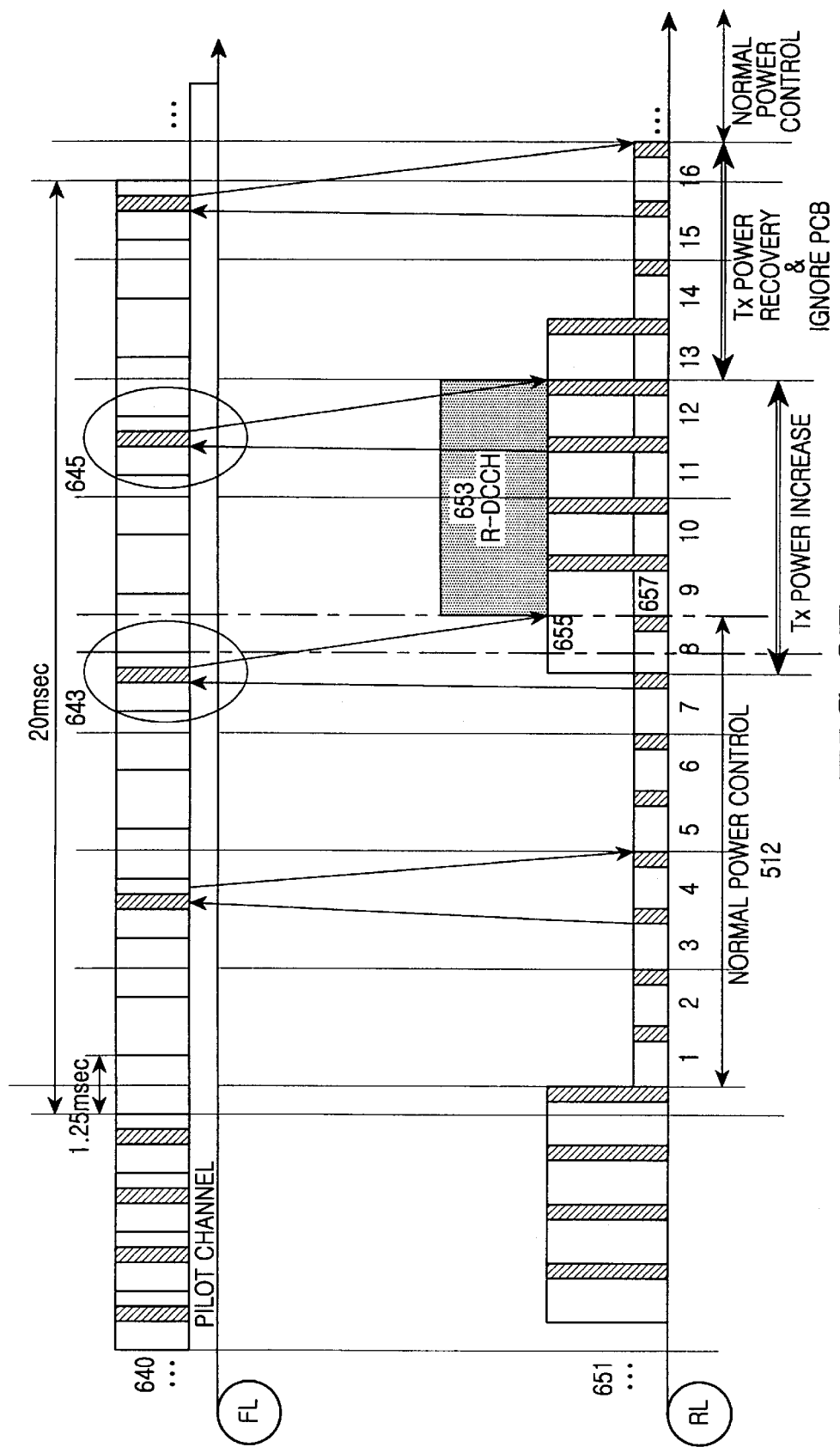
Figure 6G:
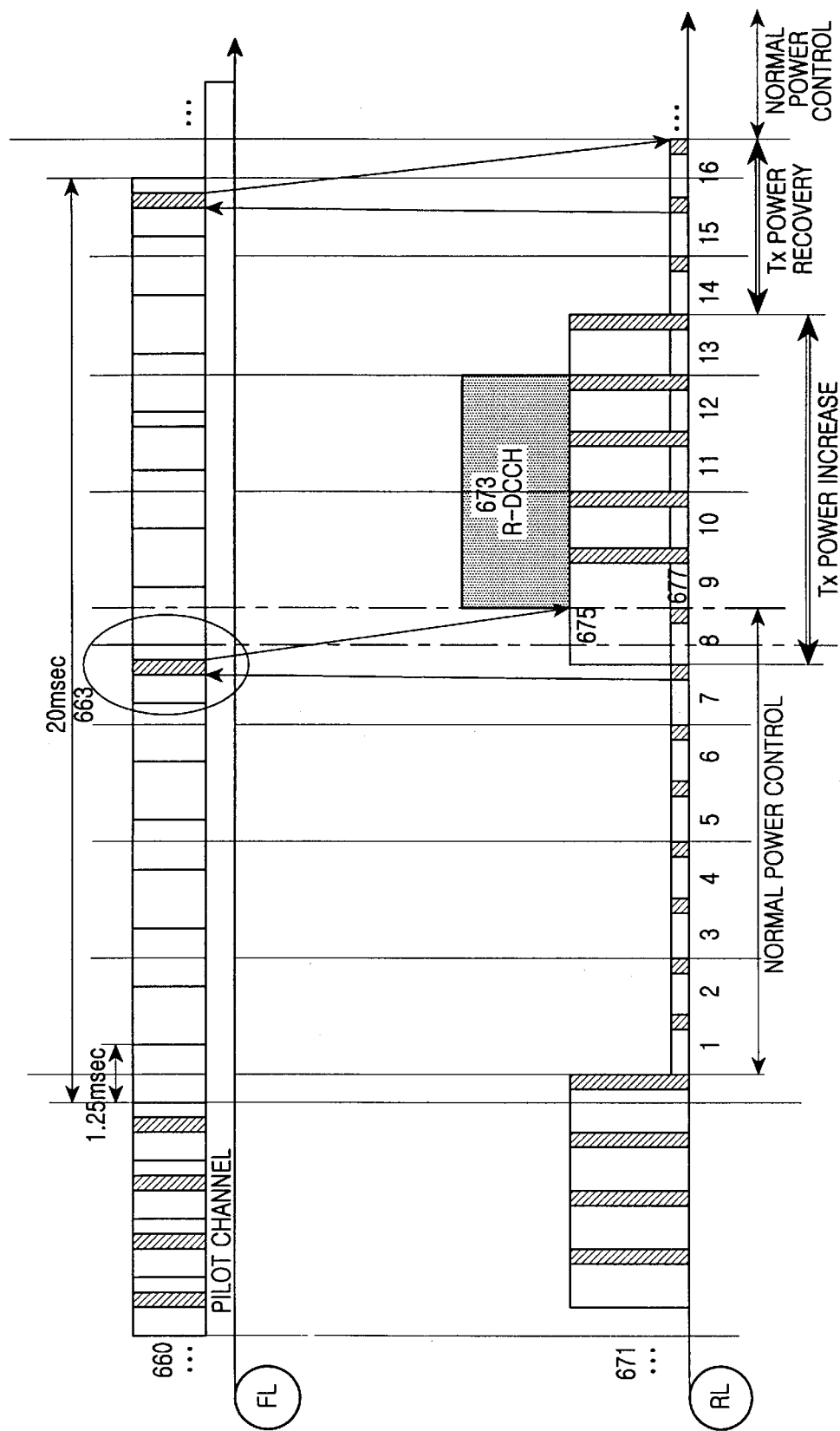
Figure 7:
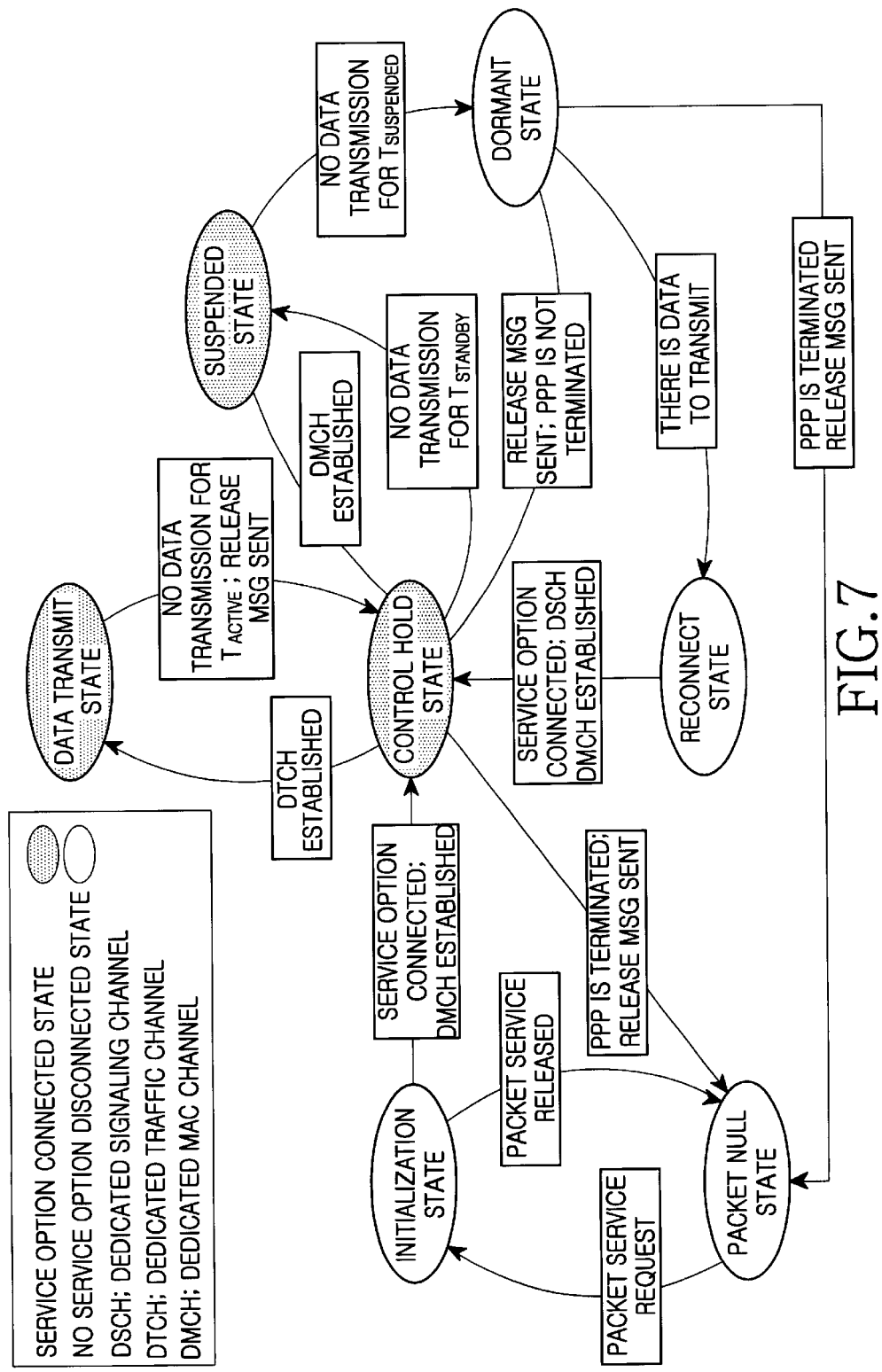
FIG. 7 is a state transition diagram for a packet data service.
Figure 8:
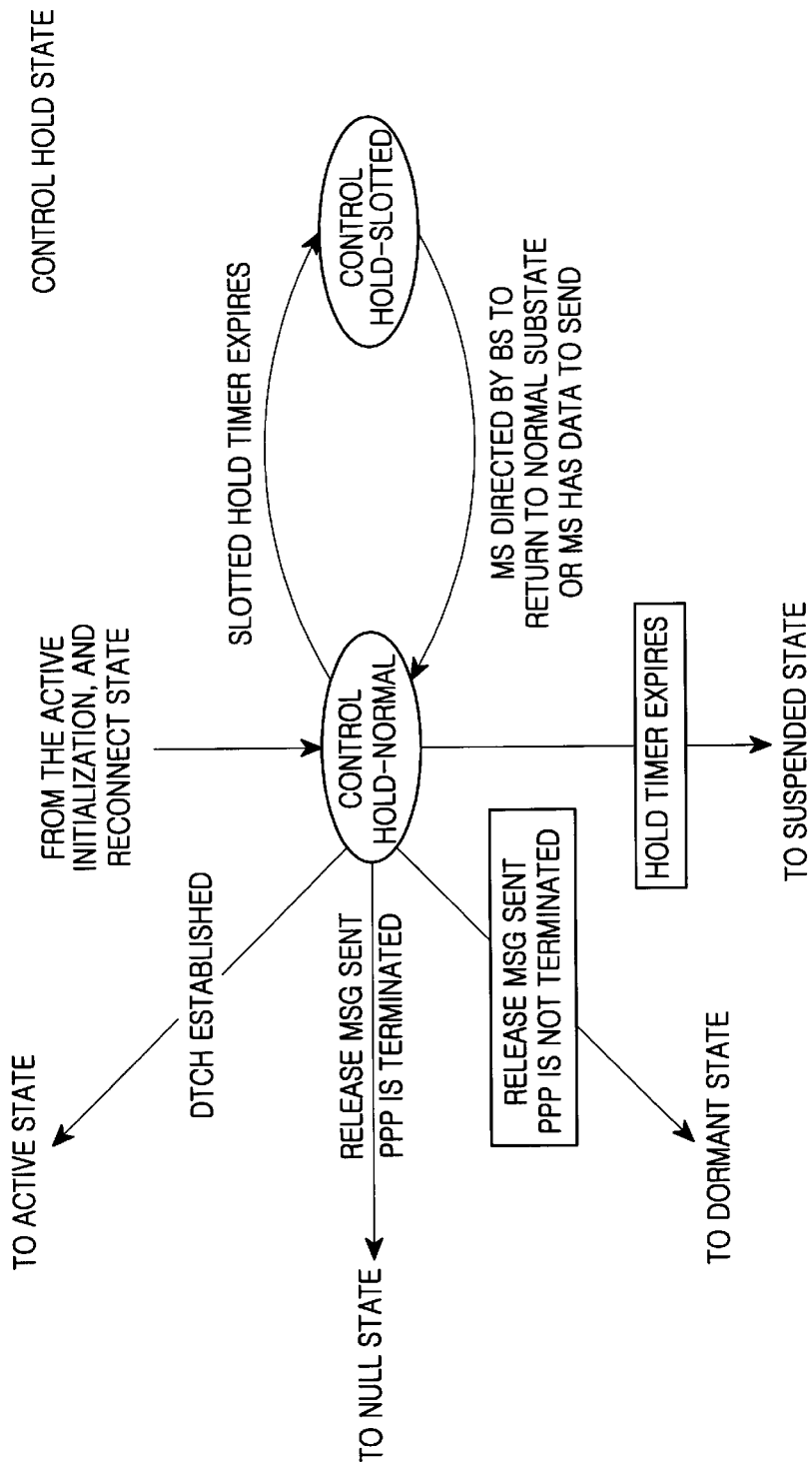
FIG. 8 is a detailed diagram illustrating a state transition occurring between substates of a control hold state shown in FIG. 7.

FIGS. 6E to 6G illustrate closed loop power control for the case where transmission power of a reverse pilot/PCB channel is increased by $\theta_1$ [dB]-$\theta_x$ [dB] (where x=2, 3, 4) from F ($\geq 1$) power control groups or time slots before the time interval where there exists the R-DCCH to B ($\geq 1$) power control groups or time slots after the above time interval, in the control hold state/normal substate according to an embodiment of the present invention. In the embodiments of FIGS. 6E to 6G, F=1 and B=1.

FIG. 6E illustrates closed loop power control for the case where a reference value for closed power control is changed to $\theta_2$ ($<\theta_1$) and the R-DCCH is activated in the control hold state/normal substate. Compared with that of FIG. 6A, a reverse closed loop power control rate is reduced to ½ by the gated transmission method. It is also possible to reduce the reverse closed loop power control rate to ½ as compared with that of FIG. 6A by the repetitive transmission method. Although FIG. 6E illustrates a ping-pong diagram for reverse closed loop power control, the same ping-pong diagram applies to forward closed loop power control. The reverse power control command or the forward pilot channel can be used in measuring the strength of a forward signal for forward closed loop power control. A reverse power control command represented by reference numeral 623 controls transmission power at a $9^{th}$ time slot represented by reference numeral 637. Transmission power of the power controlled reverse pilot/PCB channel is maintained at a reference level for the time interval where the R-DCCH is activated, and becomes a reference value for initial transmission power of the reverse pilot/PCB channel after termination of the duration where the R-DCCH is activated. After termination of the R-DCCH, reverse closed loop power control is performed based on the initial transmission power of the reverse pilot/PCB channel. Due to activation of the R-DCCH, a mobile station does not perform a normal power control process for a reverse power control command that a base station has generated and transmitted on the basis of the transmission power of the reverse pilot/PCB channel increased. For effective channel estimation at an $8^{th}$ (=9−F=9−1) power control group or time slot at a base station, transmission power of the reverse pilot/PCB channel is increased by an amount $\theta_1$ [dB]-$\theta_2$ [dB] based on transmission power at a $7^{th}$ power control group or time slot, as represented by reference numeral 635. At the $9^{th}$ power control group or time slot, power control is performed according to a power control command represented by reference numeral 623, generated on the basis of the $7^{th}$ power control group or time slot. In accordance with an exchange law of multiplication (a×b×c=a×c×b), the power control is equivalent to controlling transmission power of the $7^{th}$ power control group or time slot according to a reverse power control command 623 and then increasing the controlled transmission power by an amount $\theta_1$ [dB]-$\theta_2$ [dB]. Transmission power of the R-DCCH, shown by reference numeral 633, is higher by $\Delta P$ than case 612 of FIG. 6A, wherein $\Delta P$ can be provided as a system parameter. Two reverse power control commands represented by reference numeral 629, which are generated on the basis of the reverse pilot/PCB channel whose transmission power is increased at a duration 633 where the R-DCCH is scheduled to be activated, are basically ignored in the mobile station. This is because the mobile station has increased transmission power of the reverse pilot/PCB channel to assist a base station to effectively receive the R-DCCH, and the base station performs power control not on the basis of a reference value $\theta_1$ but a reference value $\theta_2$ ($<\theta_1$) since it is not possible to know whether the R-DCCH is activated or not at the duration where the R-DCCH is activated, so that a power-down command will be received unless the mobile station undergoes abrupt fading. When the reverse power control command corresponds to a power-up command, the mobile station can increase transmission power thereof according to the reverse power control command, and whether the system will accept the power-up command is determined in the system design process.

FIG. 6F illustrates closed loop power control for the case where a reference value for closed power control is changed to $\theta_3$ ($<\theta_2<\theta_1$) and the R-DCCH is activated in the control hold state/normal substate. Compared with that of FIG. 6A, a reverse closed loop power control rate is reduced to ¼ by the gated transmission method. It is also possible to reduce the reverse closed loop power control rate to ¼ by the repetitive transmission method as illustrated in FIG. 6A. Although FIG. 6F illustrates a ping-pong diagram for reverse closed loop power control, the same ping-pong diagram applies to forward closed loop power control. The reverse power control command or the forward pilot channel can be used in measuring the strength of a forward signal for forward closed loop power control. A reverse power control command represented by reference numeral 643 controls transmission power at a $9^{th}$ time slot represented by reference numeral 657. Transmission power of the power controlled reverse pilot/PCB channel is maintained at a reference level for a duration where the R-DCCH is activated, and becomes a reference value for initial transmission power of the reverse pilot/PCB channel after termination for the time interval where the R-DCCH is activated. After termination of the R-DCCH, reverse closed loop power control is performed based on the initial transmission power of the reverse pilot/PCB channel. Due to activation of the R-DCCH, a mobile station does not perform a normal power control process for a reverse power control command that a base station has generated and transmitted on the basis of an increased transmission power of the reverse pilot/PCB channel increased. For effective channel estimation at an $8^{th}$ (i.e., =9−F=9−1) power control group or time slot at a base station, transmission power of the reverse pilot/PCB channel is increased by an amount $\theta_1$ [dB]-$\theta_3$ [dB] based on transmission power at a $7^{th}$ power control group or time slot, as represented by reference numeral 655. At the $9^{th}$ power control group or time slot, power control is performed according to a power control command represented by reference numeral 643, generated on the basis of the $7^{th}$ power control group or time slot. In accordance with an exchange law of multiplication (a×b×c=a×c×b), the power control is equivalent to controlling transmission power of the $7^{th}$ power control group or time slot according to a reverse power control command 643 and then increasing the controlled transmission power by an amount $\theta_1$ [dB]-$\theta_3$ [dB]. Transmission power of the R-DCCH, shown by reference numeral 653, is higher by ΔP than case 612 of FIG. 6A, wherein ΔP can be given as a system parameter. Reverse power control commands represented by reference numeral 645, which are generated on the basis of the reverse pilot/PCB channel whose transmission power is increased at a duration 653 where the R-DCCH is activated, is basically ignored in the mobile station. This is because the mobile station has increased transmission power of the reverse pilot/PCB channel to assist a base station to effectively receive the R-DCCH, and the base station performs power control not on the basis of a reference value $\theta_1$ but a reference value $\theta_3$ ($<\theta_1$) since it is not possible to know whether the R-DCCH is activated or not at the duration where the R-DCCH is activated, so that a power-down command will be received unless the mobile station undergoes abrupt fading. When the reverse power control command corresponds to a power-up command, the mobile station can increase transmission power thereof according to the reverse power control command, and whether the system will accept the power-up command is determined in the system design process.

FIG. 6G illustrates closed loop power control for the case where a reference value for closed power control is changed to $\theta_4$ ($<\theta_3<\theta_2<\theta_1$) and the R-DCCH is activated in the control hold state/normal substate. Compared with that of FIG. 6A, a reverse closed loop power control rate is reduced to ⅛ by the gated transmission method. It is also possible to reduce the reverse closed loop power control rate to ⅛ by the repetitive transmission method. Although FIG. 6G illustrates a ping-pong diagram for reverse closed loop power control, the same ping-pong diagram applies to forward closed loop power control. The reverse power control command or the forward pilot channel can be used in measuring the strength of a forward signal for forward closed loop power control. A reverse power control command represented by reference numeral 663 controls transmission power at a $9^{th}$ time slot represented by reference numeral 677. Transmission power of the power controlled reverse pilot/PCB channel is maintained at a reference level for a time interval where the R-DCCH is activated, and becomes a reference value for initial transmission power of the reverse pilot/PCB channel after termination of the duration where the R-DCCH is activated. After termination of the R-DCCH, reverse closed loop power control is performed based on the initial transmission power of the reverse pilot/PCB channel. Due to activation of the R-DCCH, a mobile station does not perform a normal power control process for a reverse power control command that a base station has generated and transmitted on the basis of an increased transmission power of the reverse pilot/PCB channel. For effective channel estimation at an $8^{th}$ (=9−F=9−1) power control group or time slot at a base station, transmission power of the reverse pilot/PCB channel is increased by the extent given in a function of $\theta_1$ [dB]-$\theta_4$ [dB] based on transmission power at a $7^{th}$ power control group or time slot, as represented by reference numeral 675. At the $9^{th}$ power control group or time slot, power control is performed according to a power control command represented by reference numeral 663, generated on the basis of the $7^{th}$ power control group or time slot. In accordance with an exchange law of multiplication, the power control is equivalent to controlling transmission power of the $7^{th}$ power control group or time slot according to a reverse power control command 663 and then increasing the controlled transmission power by the extent given in the function of $\theta_1$ [dB]-$\theta_4$ [dB] (a×b×c=a×c×b). Transmission power of the R-DCCH, shown by reference numeral 673, is higher by ΔP than case 612 of FIG. 6A, wherein ΔP can be provided as a system parameter. A reverse power control command (which does not exist in the embodiment of FIG. 6G) generated on the basis of the reverse pilot/PCB channel whose transmission power is increased at a duration 673 where the R-DCCH is activated, is basically ignored in the mobile station. This is because the mobile station has increased transmission power of the reverse pilot/PCB channel to assist a base station to effectively receive the R-DCCH, and the base station performs power control not on the basis of a reference value $\theta_1$ but a reference value $\theta_4$ ($<\theta_1$) since it is not possible to know whether the R-DCCH is activated or not for the time interval where the R-DCCH is scheduled to be activated, so that a power-down command will be received unless the mobile station undergoes abrupt fading. When the reverse power control command corresponds to a power-up command, the mobile station can increase transmission power thereof according to the reverse power control command, and whether the system will accept the power-up command is determined in the system design process.

In summary, the conventional method for controlling transmission power of a reverse pilot/PCB channel uses a reference value for closed loop power control, in the control hold state/normal substate. This approach is advantageous in that the base station can maintain a low sync loss probability. There is an associated drawback in that the reverse pilot/PCB channel is transmitted even when there is no reverse message to transmit, thus increasing interference of the reverse link. The increase in interference of the reverse link causes two undesirable situations; a reduction in capacity of the reverse link and an increase in power consumption of a mobile station. The increase in power consumption contributes to an increase in operating time of the mobile station. In addition, continuous transmission of a reverse power control bit over a forward link causes an increase in interference of the forward link and a reduction in capacity of the forward link. The novel communication device and method of the present invention minimizes the sync loss probability at the base station and an increase in interference due to transmission of the reverse power control bit, minimizes an increase in interference due to transmission of a reverse pilot/PCB channel within a permissible sync loss probability, and maximizes an operating time of the mobile station.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mobile communication system, comprising:
   a base station device for changing a reference value set for reverse closed loop power control in an active state in to a lower reference value to be used in a control hold state, and transmitting a power control bit for controlling transmission power of a reverse link according to the changed reference value; and
   a mobile station device for controlling transmission power of a reverse pilot channel according to the power control bit from the base station device.

2. The mobile communication system as claimed in claim 1, wherein the base station device determines a gating rate representing a transmission period of a power control bit, and transmits the power control bit at the determined gating rate.

3. The mobile communication system as claimed in claim 1, wherein the reverse pilot channel includes forward power control information.

4. The mobile communication system as claimed in claim 1, wherein upon activation of a reverse dedicated control channel, the base station device increases a transmission power of the reverse pilot channel above a reference value for performing reverse closed loop power control.

5. The mobile communication system as claimed in claim 3, wherein the mobile station device increases the transmission power of the reverse dedicated control channel by a predetermined amount which is defined as a system parameter.

6. The mobile communication system as claimed in claim 3, wherein the mobile station device neglects a reverse power control bit received at an activated time of the reverse dedicated control channel.

7. The mobile communication system as claimed in claim 3, wherein the mobile station device ignores a power-down command contained within reverse power control bits at a duration where the reverse dedicated control channel is activated, and applies a power-up command contained within the received reverse power control bits to control the transmission power of the reverse link.

8. The mobile communication system as claimed in claim 1, wherein upon activation of a reverse dedicated control channel, the mobile station device increases a transmission power of the reverse pilot channel above the reference value for performing closed loop power control for a duration defined as a system parameter, including a duration where the reverse dedicated control channel is activated.

* * * * *